(12) United States Patent
Hahn et al.

(10) Patent No.: US 6,941,879 B2
(45) Date of Patent: Sep. 13, 2005

(54) PROCESS AND GAS GENERATOR FOR GENERATING FUEL GAS

(75) Inventors: Hans Helmut Hahn, Pretoria (ZA); Heinz Gustav Mallek, deceased, late of Erkelenz (DE); by Kirsten Braeker, legal representative, Linnich (DE); Heinrich Mosch, Butzbach (DE)

(73) Assignee: Foretop Corporation, Raodtown (VG)

( * ) Notice: Subject to any disclaimer, the term of this patent is extended or adjusted under 35 U.S.C. 154(b) by 0 days.

(21) Appl. No.: 10/433,787

(22) PCT Filed: Dec. 10, 2001

(86) PCT No.: PCT/ZA01/00196

§ 371 (c)(1), (2), (4) Date: Feb. 17, 2004

(87) PCT Pub. No.: WO02/46332

PCT Pub. Date: Jun. 13, 2002

(65) Prior Publication Data

US 2004/0182294 A1 Sep. 23, 2004

(30) Foreign Application Priority Data

Dec. 8, 2000 (DE) .......................................... 100 61 472

(51) Int. Cl.⁷ ................................ F23B 7/00; C10J 3/34
(52) U.S. Cl. ....................... 110/341; 110/229; 110/315; 48/197 R
(58) Field of Search ............................... 48/197 R, 111, 48/76; 110/315, 229, 230, 232, 231, 255, 342, 346, 233

(56) References Cited

U.S. PATENT DOCUMENTS 4,194,455 A * 3/1980 Mallek et al. .............. 110/251
4,306,506 A * 12/1981 Rotter ........................ 110/229
4,773,918 A * 9/1988 Kohl .......................... 48/197 R
4,929,254 A * 5/1990 Kooiman et al. .............. 48/76
5,401,166 A    3/1995 Mallek et al.

FOREIGN PATENT DOCUMENTS

| CA | 1311923 | 12/1992 | |
|---|---|---|---|
| DE | 3049250 A1 * | 9/1982 | .............. C10J/3/64 |
| DE | 3312863 | * 10/1984 | ............. F23G/7/06 |
| DE | 3544792 | 7/1986 | |
| DE | 4435349 | 5/1996 | |
| DE | 19755700 | 6/1999 | |

* cited by examiner

*Primary Examiner*—Kenneth Rinehart
(74) *Attorney, Agent, or Firm*—Elbie R. de Kock

(57) ABSTRACT

A process and gas generator is disclosed for generating by dry distillation of solids and gasification of solids, a fuel gas substantially free of condensable dry distillation volatiles which would interfere with the intended use of the gas, e.g. for powering an internal combustion engine.

To achieve this, solids beds in distinct dry distillation and gasification zones are maintained under conditions favouring thermal cracking of condensable (tar) volatiles in the hot regions of both zones. For optimal control of these conditions these zones are physically separated by internals within a single reactor vessel and optionally by performing part of the dry distillation (pyrolysis) in a separate reactor vessel, in which case pyrolysis volatiles are fed in counter-current to the dry distillation bed, withdrawn from the top thereof and fed into and through the embers bed of the gasification zone. Thermal cracking of pyrolysis volatiles is prolonged and intensified by the manner in which these volatiles are conducted in intimate contact through the embers bed of the gasification zone in co-current therewith. The embers bed is guided along a progressively constricting pathway, which controls the rate of travel of and the period of residence of the solids bed in the process and generator.

21 Claims, 11 Drawing Sheets

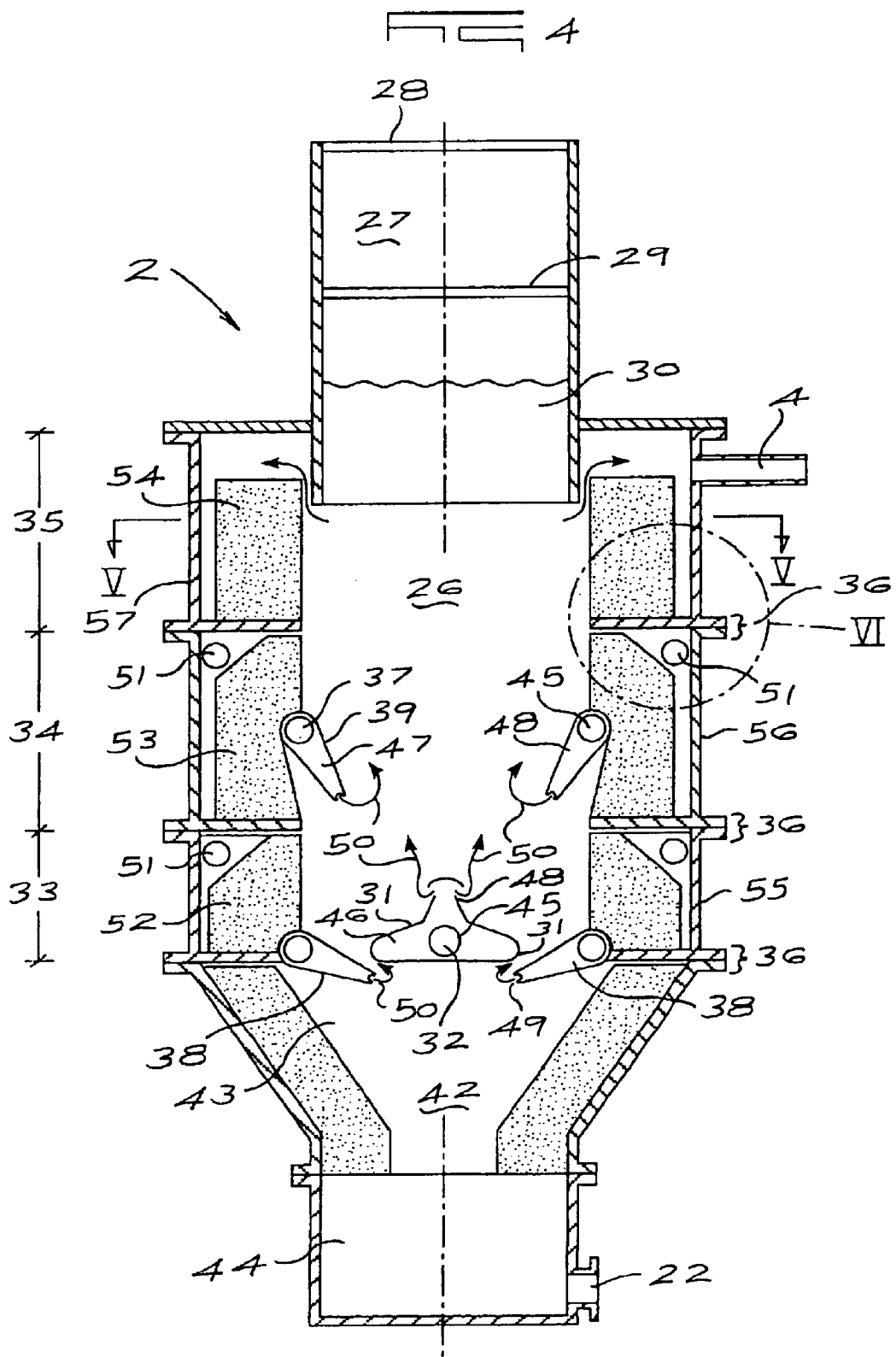

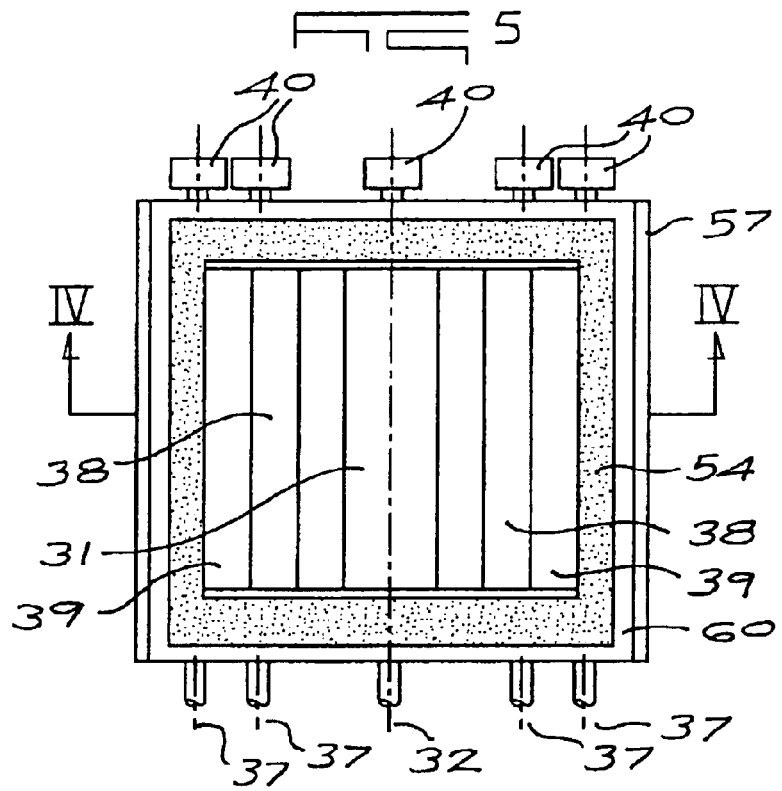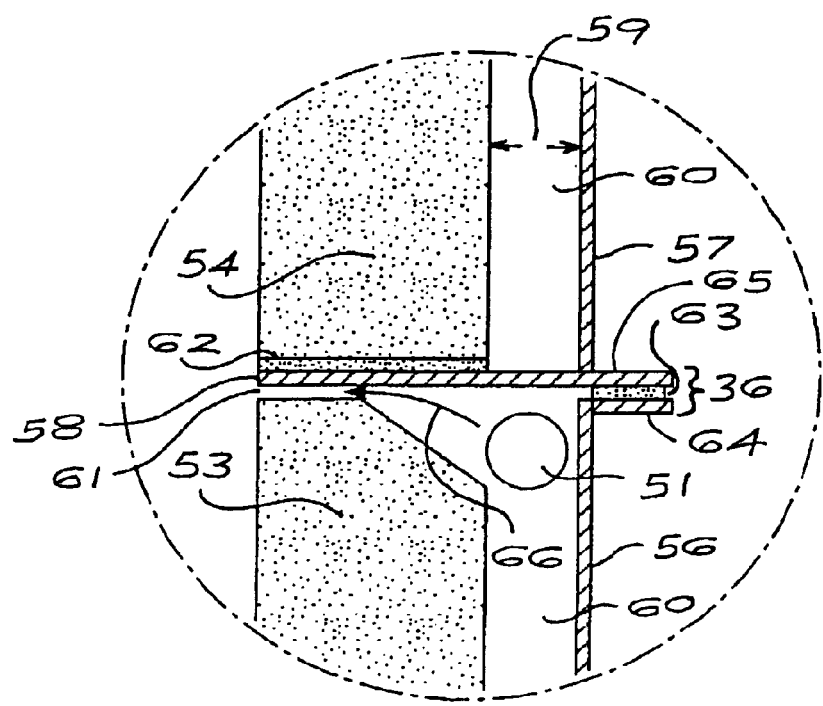

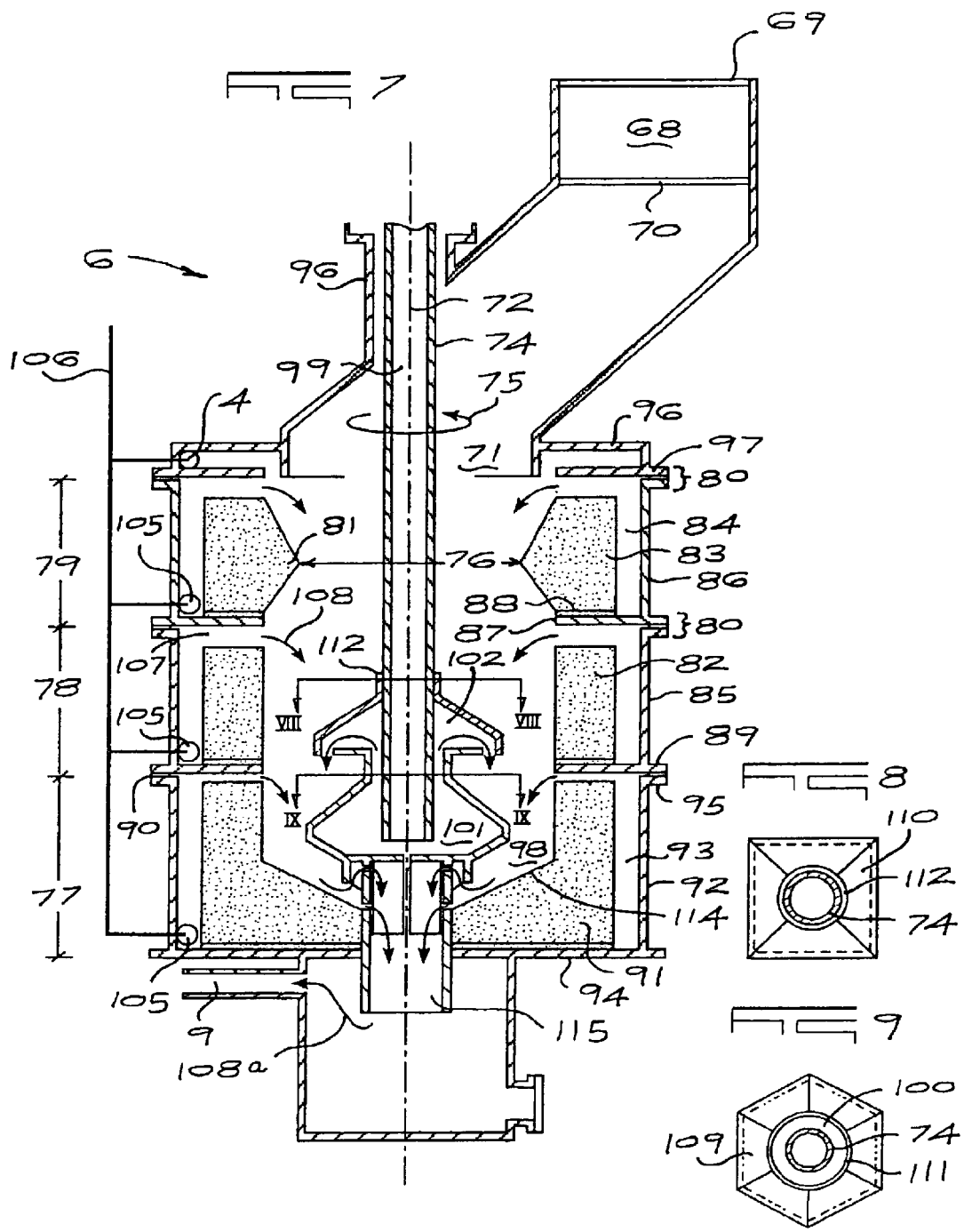

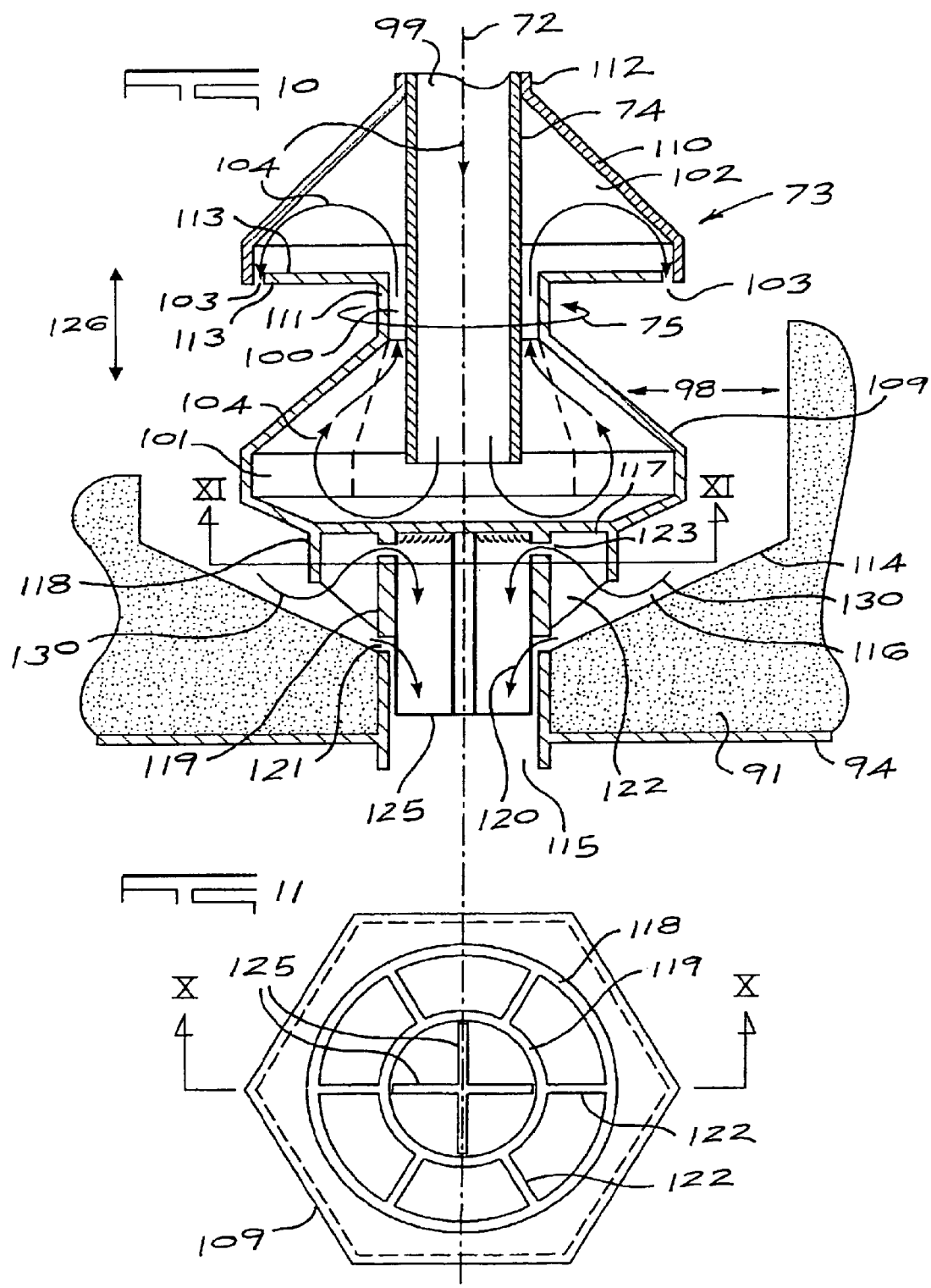

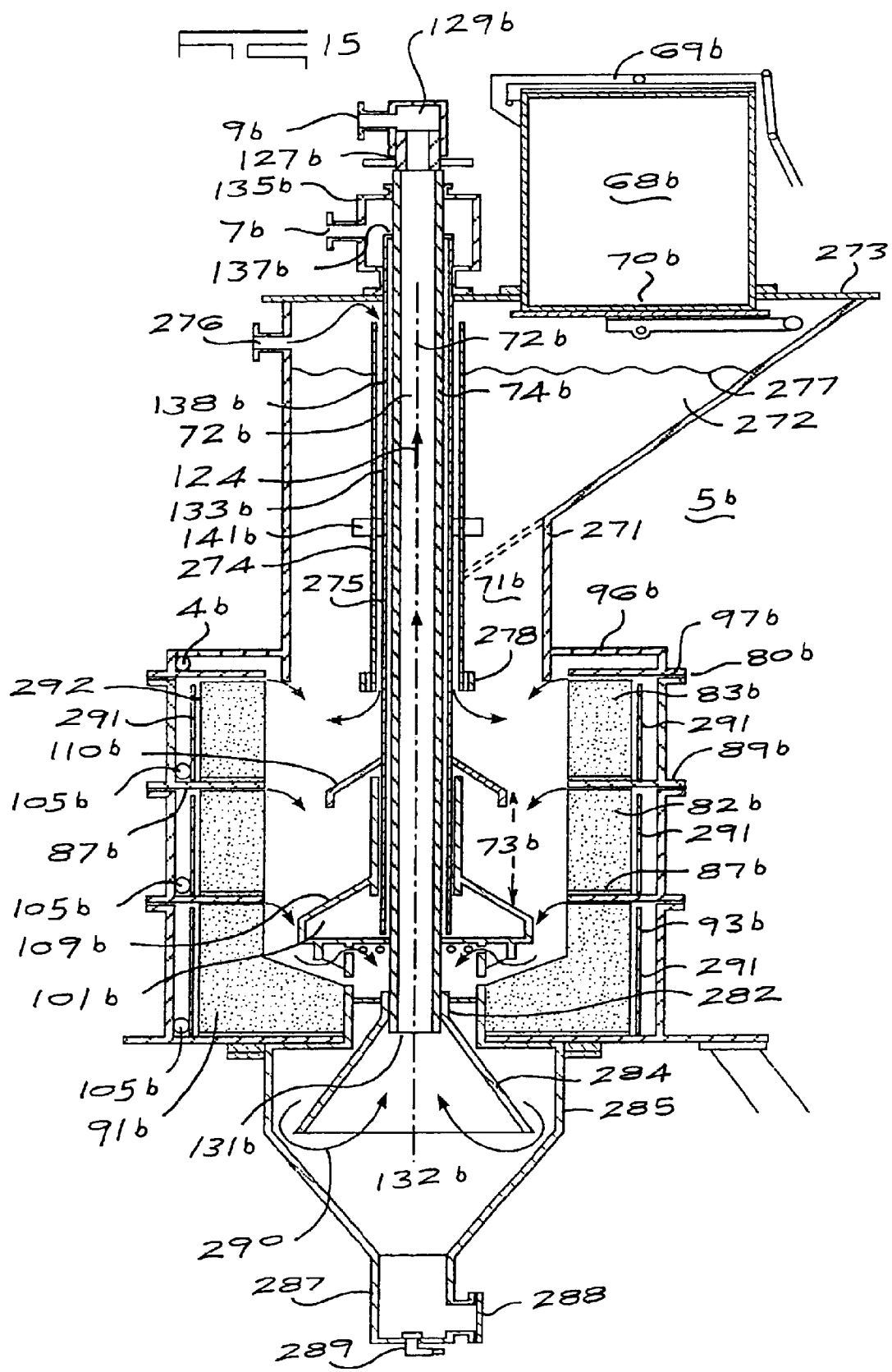

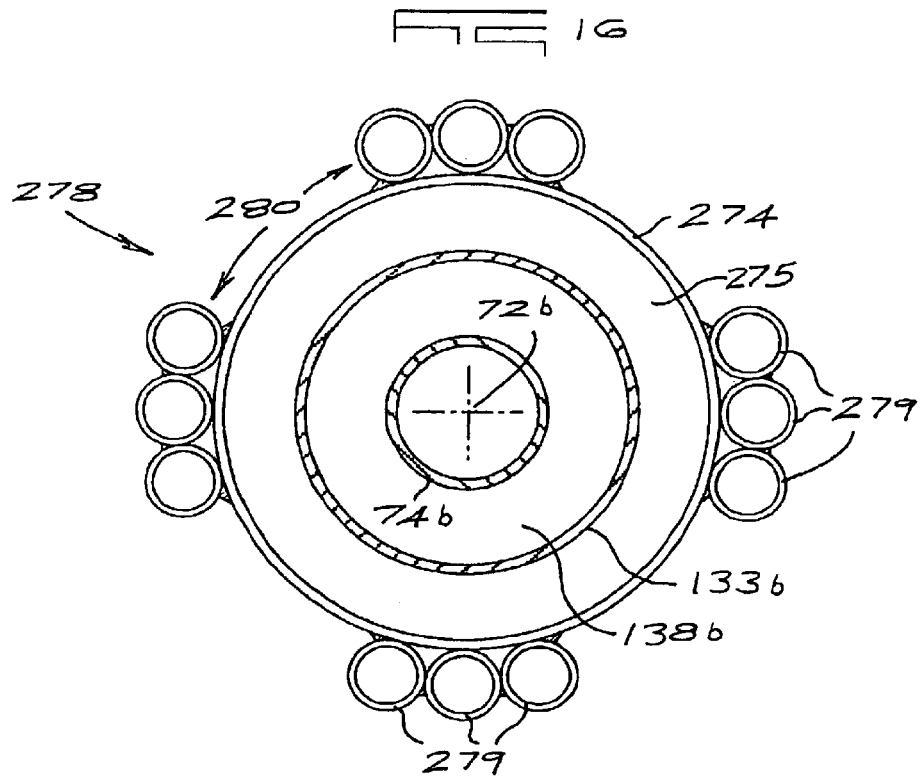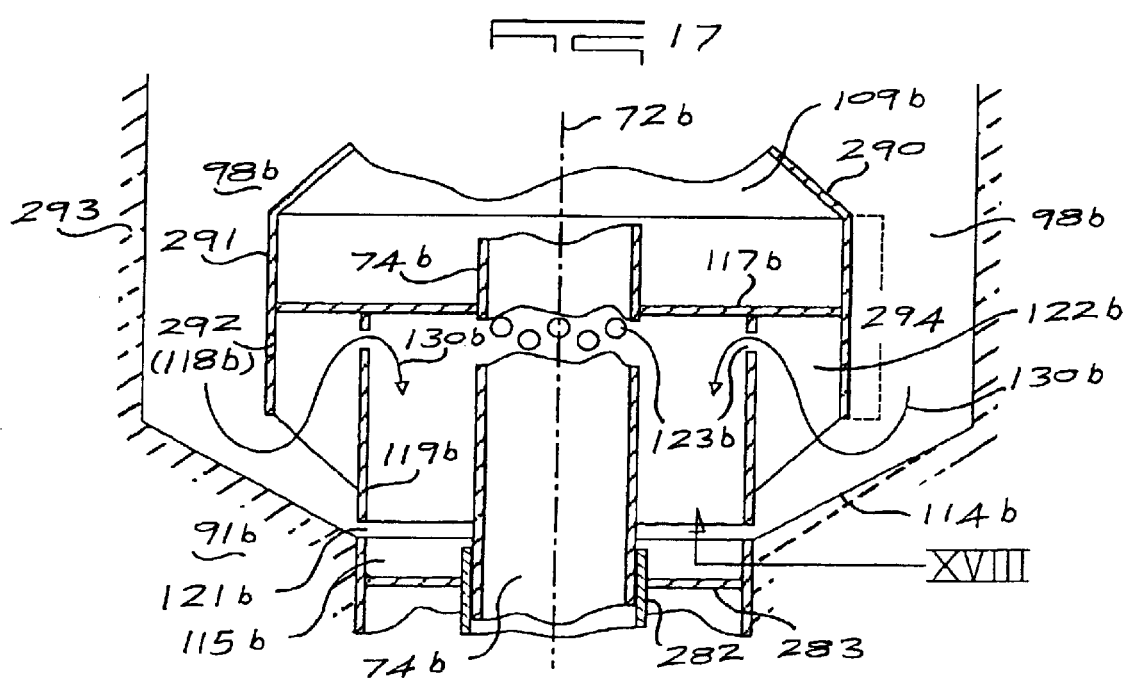

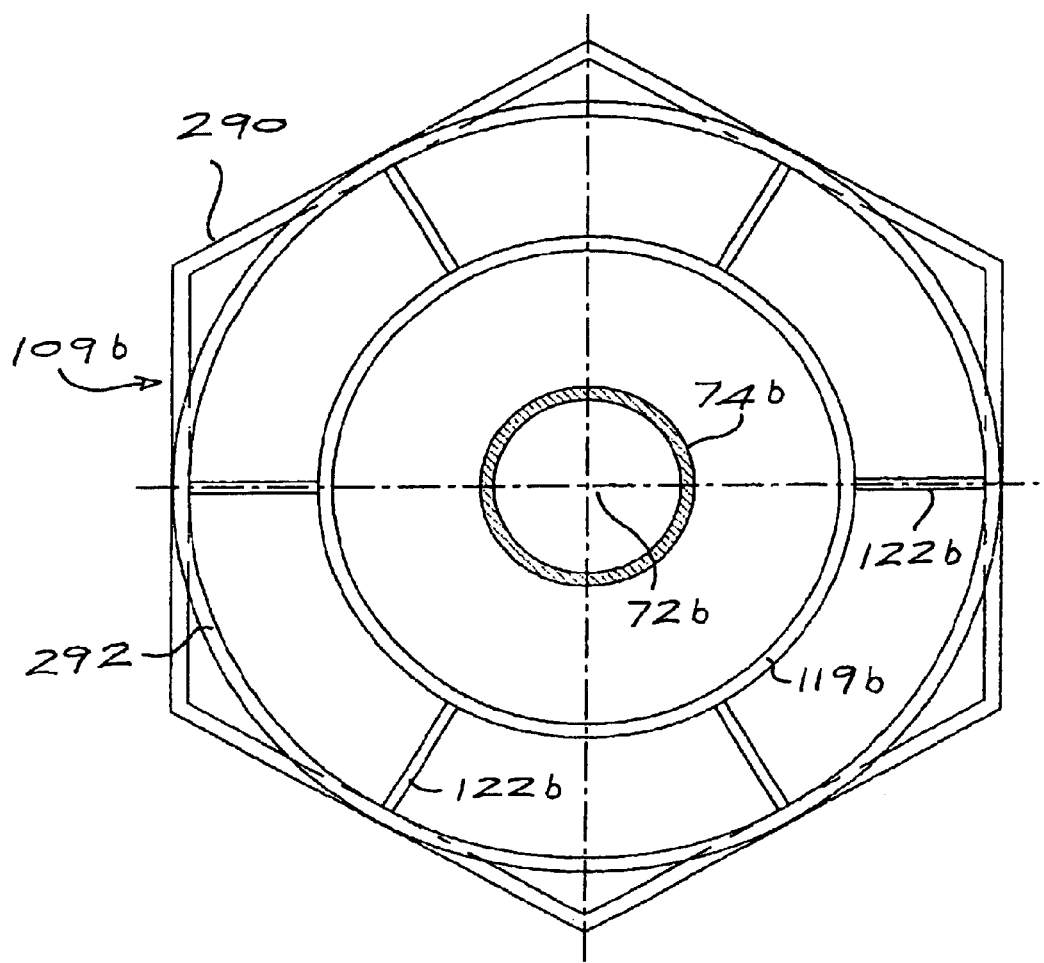

PROCESS AND GAS GENERATOR FOR GENERATING FUEL GAS

FIELD OF THE INVENTION

The invention relates to a process for generating fuel gas by dry distillation of solids and subsequent gasification of solids. The invention also relates to a gas generator suitable for performing the process.

BACKGROUND OF THE INVENTION

The invention is based on the following state of the art:

The invention starts from a process such as may, for example, be performed using a gas processor as described in DE 33 12 863 C2. In that process the solid matter to be processed which contains gasifiable organic material, passes under the action of gravity through a pyrolysis chamber in which initially—in the absence of air—these solids are thermally subjected to dry distillation at a temperature of about 500° C. and are subsequently gasified for fuel gas generation by the addition of gasification medium at a temperature of about 800° C. The gasification media are introduced substoichiometrically in relation to the oxidisable material content. The organic solids which are fed into the upper region of the pyrolysis chamber form in the gas processor a particulate solids bed, which is supported by a material lock element which limits the pyrolysis chamber at its lower end. In the region of the material lock element passages are provided for the fuel gas generated in the pyrolysis chamber. The residual material as well, which remains after the conversion of the organic solids in the particulate solids bed, emerges through the passages downwardly from the pyrolysis chamber. The material lock element is movable and promotes, acting as a discharge element, the discharge of the residues from the particulate solid bed. The gasifying media, air and/or steam, which are introduced into the particulate solids bed in substoichiometrical ratio, pass through the particulate solids bed in the direction of gravity, something which is attained by the maintenance of a pressure gradient between the feed locality of the gasification media into the pyrolysis chamber and the outlet for the fuel gas at the passages associated with the discharge element. Accordingly, dry distillation volatiles and gasification media as well as the fuel gas generated in the pyrolysis chamber pass through the gas processor in co-current.

Using this flow mode, the dry distillation volatiles generated in the dry distillation zone of the particulate solids bed during dry distillation of the organic solids are passed through the gasification zone following downstream in the pyrolysis chamber such that part of the pyrolysis volatiles react with the gasification media and are combusted. In the region of the discharge element there is formed accordingly an embers bed. It is a feature of the gas processor known from DE 33 12 863 C2 that the dry distillation volatiles while passing through the embers bed are cracked: the tarry long-chain hydrocarbon components and other condensable compounds of the dry distillation volatiles are converted into non-condensable short-chain hydrocarbon and other low molecular weight compounds. A high-quality fuel gas is thus formed which can be utilised not only by being combusted and used as heating gas in heat exchangers for heat generation, but it can also be used as a fuel for the operation of internal combustion engines.

Dry distillation, also known as low temperature carbonisation, is a process, wherein carbonaceous solids, such as wood, but also waste materials such as old tyres and plastic wastes are heated to temperatures at which the solids are decomposed to release a variety of volatiles and to usually leave behind a carbonised residue such as coke or charcoal.

It is a problem in the process of the afore described type that inside the particulate solid bed, where lumps of varying sizes occur of the organic material to be processed, no homogeneous solids density can be attained as a result of which the reduced pressure in the combustion chamber below the discharge element for the withdrawal of the gases will not result in a constantly maintained pressure gradient within the particulate solids bed. In such regions within the particulate solids bed, in which material bridges and cavities are formed, faulty reactions and undesired flame breakthrough may occur, even in a direction opposite to the set up co-current direction. Likewise, an inadequate conversion of the dry distillation volatiles may occur in the embers bed whereby the quality of the fuel gases generated is compromised by dry distillation volatiles inadequately cracked in the embers bed being drawn off prematurely. Frequently the setting up of optimal parameters for the gasification process and for the conversion of dry distillation volatiles in the embers bed results in undesirable conditions in the particulate solids bed of the dry distillation zone and vice versa, such that the control of the gas processor is unstable.

The structure of the particulate solids bed and the dry distillation attained in the particulate solids bed, degassing and gasification are dependent on the solids to be converted, their properties and geometrical configurations, in particular their homogeneity and sizing. If an optimised gas generation is to be attained, the gas generator must in each situation be adapted to these material properties and geometrical configurations. For attaining a high fuel gas quality, the dimensions and the design of the gas generator are, therefore, also crucial. This applies particularly in the context of channelling in the particulate solids bed. Whether such particulate solids channelling has a negative effect also on the conversion of the solids and on the fuel gas quality attained in the gas processor will, however, also depend on the technical design and construction of the pyrolysis chamber. It is known to provide in the pyrolysis chamber agitation elements, which break up channelling formed in the particulate solids bed whenever they occur, in which context reference is made, for example, to DE 197 55 700 A1.

From DE 30 49 250 C2 it is known to convert the input material in two stages. The material is initially dried and devolatilised in a rotary drum and thereafter the fuel gas is generated in a gasification shaft reactor downstream of the rotary drum. In this context a separation of the solids may be performed where the devolatilised material exits from the rotary drum so that only part of the material, i.e. the material which has been carbonised in the rotary drum is introduced into the gasification shaft reactor. Components of the solid feed materials which are unsuitable for gasification, are separately discharged before they can enter the gasification shaft reactor. In order to dry and devolatilise the material, the exterior wall of the rotary drum is heated, drying and devolatilisation being performed in the absence of air. The gases thereby formed are withdrawn from the rotary drum in the conveyance direction of the material in co-current It is a disadvantage that the thermal conditions for the formation of dry distillation volatiles are not adequately adaptable dynamically to the conversion in the gasification shaft reactor. The required control of the processor reacts too slowly when adaptations are necessary to the material conversions taking place and, more particularly, the gas processor is adaptable to different qualities of available materials for processing only at high cost.

A need has been recognised to provide a process and a gas generator adaptable in a simple manner to whatever solids must be processed. On the one hand, the solids are to form within the gas generator a particulate solids bed which is optimised for the fuel generation and within which an adequate dry distillation of the material can be attained. On the other hand, the high molecular weight hydrocarbon and other compounds in the dry distillation volatiles should be cracked as completely as possible in the gas processor. Dry distillation and gasification should be adaptable to one another in an optimised manner depending on the material to be processed. For that purpose it has now been recognised in accordance with the invention that more effective and more reliable intimate contact needs to be achieved for an adequate duration within an appropriately set up temperature range to ensure adequate and substantially complete cracking of all condensable volatiles which otherwise interfere with the satisfactory operation of internal combustion engines and which can even interfere with the operation of sensitive burner nozzles.

It is, moreover, the intention that the gas generator, even after having been taken into operation, should be adaptable and dimensionable with relatively little effort in accordance with data which are established empirically only during actual operation.

Particular needs have been recognised for a fuel gas generator process and apparatus that is on the one hand readily adaptable on the spot to changing circumstances and is on the other hand fully self-sufficient and therefore suitable for being used as a decentralised power source, capable of being operated independently of whether or not a power grid is available.

These needs are even more pressing in remote and underdeveloped regions inter alia in the following respects and to fill the following needs:
ability to utilise all kinds of available combustible materials (gasifiable and/or dry-distillable);
seasonal variations of these supplies;
wastes which need to be disposed of;
energy needs: mechanical, electrical and thermal energy and fluctuations of these needs;
alternative uses of the products of dry distillation and/or gasification.

SUMMARY OF THE INVENTION

These objects are attainable in a process of the genus referred to in the introduction according to the invention which may be defined as a process for the generation of a fuel gas by dry distillation of carbonaceous solids in a dry distillation zone into which the carbonaceous solids are fed via a solids supply and in which the solids are heated, where applicable dried and are dry-distilled with the liberation of dry distillation volatiles and, by further conversion of those volatiles in a gasification zone in the presence of carbonaceous solids passing through the gasification zone at least in part under gravity in the form of a bed of particulate solids, to which gasification media are fed in substoichiomentric quantities, the dry distillation volatiles withdrawn from the dry distillation zone entering the gasification zone and flowing through the bed of particulate solids being there maintained in co-current with the direction of travel of the latter, an embers bed being formed by the bed of particulate solids in the terminal portion of the gasification zone in the region of a discharge element for substantially fully gasified material, through which embers bed the gas formed in the bed of particulate solids passes, whereby condensable volatiles components contained in the gas are cracked, and wherein the fuel gas so generated is withdrawn from the lower region of the bed of particulate solids of the gasification zone.

The generic type of the apparatus for performing such a process may be defined as a gas generator for generating a fuel gas, including a solids feeder, discharging into a dry distillation zone, wherein solids introduced by the solids feeder are heated, dried if necessary, and subjected to dry distillation thereby to release dry distillation volatiles downstream of the dry distillation zone into a gasification zone supplied with and containing a bed of gasifiable carbonaceous solids, supported on a fire grate device restricting the rate of downward movement of the solids of the bed under gravity, in co-current with dry distillation volatiles released from the dry distillation zone flowing through the bed of gasifiable carbonaceous solids, a supply of oxygen-bearing gas in the dry distillation zone supporting partial combustion for heating the dry distillation zone and a supply of gasification medium maintaining gasification conditions in the gasification zone, at least the lower region of the bed of gasifiable carbonaceous solids being maintained in an embers bed condition through which the dry distillation volatiles and volatilised products of gasification pass in order to be subjected to thermal cracking.

In accordance with a first aspect thereof the present invention provides a process for the generation of a fuel gas by dry distillation of carbonaceous solids in a dry distillation zone into which the carbonaceous solids are fed via a solids supply and in which the solids are heated, where applicable dried and are dry-distilled with the liberation of dry distillation volatiles and, by further conversion of those volatiles in a gasification zone in the presence of carbonaceous solids passing through the gasification zone at least in part under gravity in the form of a bed of particulate solids, to which gasification media are fed in substoichiometric quantities, the dry distillation volatiles withdrawn from the dry distillation zone entering the gasification zone and flowing through the bed of particulate solids being there maintained in co-current with the direction of travel of the latter, an embers bed being formed by the bed of particulate solids in the terminal portion of the gasification zone in the region of a fire grate element acting further as a solids discharge element for the residual solids after completion of the gasification, through which embers bed the gas formed in the bed of particulate solids passes, whereby condensable volatiles components contained in the gas are cracked, and wherein the fuel gas so generated is withdrawn from the lower region of the bed of particulate solids of the gasification zone, wherein gas containing oxygen is introduced into the dry distillation zone in substoichiometric amount for generating heat by partial combustion of the solids to be dry-distilled passing through the dry distillation zone in the form of a bed of particulate solids under the action of gravity before the generated fuel gas product is separated from ashes and any cinders and is withdrawn and forwarded for further use, said process further comprising additional measures for further decreasing the content of condensable dry distillation volatiles in the fuel gas product-by increasing the intimate contact of the gases and vapours with the solids beds through which they pass, selected from either or both of the following:
  A) that the embers bed of the gasification zone is conducted from the higher lying regions of said zone under gravity towards and through a constricted lower peripheral passage region of the gasification zone defined between the outer periphery of the fire grate element and the inner periphery of exterior walls of a reactor in which the process is performed, and in co-current therewith the dry distillation volatiles and gasification gases and any gaseous cracking products are passed in intimate contact with and through the embers bed and from there travels down a funnel-shaped constricting pathway below the fire grate element leading into and ending with the ash withdrawal region, where the separation occurs between the ashes and any cinders and the generated fuel gas product;

B) that in at least one dry distillation zone in the form of a bed of particulate solids under the action of gravity the gas present in that zone passes through the solids in counter-current to the direction of travel of the solids to be dry distilled, the solids thereby being dry distilled and the dry distillation volatiles thereby formed in the dry distillation zone being withdrawn from the dry distillation zone near the solids supply region and that at least part of the dry distillation volatiles formed in the dry distillation zone withdrawn from near the solids supply region feeding the dry distillation zone with carbonaceous solids are from there forwarded into the gasification zone, where they, together with gasification gases and any gaseous cracking products, pass in co-current with and in intimate contact with and through the embers bed of the gasification zone and are subjected to cracking of condensable volatiles, before being separated from ashes and any cinders and being withdrawn as a fuel gas product.

According to a second aspect of the invention there is provided a gas generator suitable for performing the process according to the invention for generating a fuel gas product, which is of the genus including solids feeder means discharging into a solids supply portion of a dry distillation zone, in which dry distillation zone solids introduced by the solids feeder means are heated, dried if necessary and subjected to dry distillation, thereby to release dry distillation volatiles into a gasification zone supplied with and containing a bed of gasifiable carbonaceous solids downstream of the dry distillation zone and supported on a fire grate device, restricting the rate of downward movement of the solids of the bed under gravity in co-current with dry distillation volatiles released from the dry distillation zone as well as the gasification media and the generated fuel gas in the gasification zone flowing through the particulate solids bed, a supply of oxygen-bearing gases in the dry distillation zone supporting partial combustion therein for heating the dry distillation zone and a supply of gasification medium being provided for maintaining gasification conditions in the gasification zone by the provision of feed lines for gasification media to be introduced into the particulate solids bed which enter into the gasification zone, at least the lower region of the bed of gasifiable carbonaceous solids being maintained in an embers bed condition through which the dry distillation volatiles and volatilised products of gasification pass in order to be subjected to thermal cracking and including an ash withdrawal region including a gas separation zone and discharge passage for the generated fuel gas product.

In accordance with the invention the apparatus provides additional features adapted for further decreasing the content of condensable dry distillation volatiles in the fuel gas product by increasing the intimate contact of the gases and vapours with the solids beds through which they pass, selected from either or both of the following:

a) that in relation to higher lying regions of the gasification zone the fire grate device, acting further as a discharge element for the solids residues of the gasification, defines a constricted peripheral passage for the embers bed of the gasification zone between the outer periphery of the fire grate device and the inner periphery of the exterior walls of the gasification zone, which constricted peripheral passage merges into a downwardly and inwardly funnel-like sloping constricting pathway below the fire grate device leading into and ending with the ash withdrawal region, where the separation occurs between the ashes and any cinders and the generated fuel gas product;

b) that through at least one dry distillation zone solids to be dry-distilled pass in the form of a particulate solids bed under the action of gravity, wherein further a gasification medium feed means for an oxygen-containing gas enters below the particulate solids bed and wherein for the withdrawal from the dry distillation zone of the dry distillation volatiles, formed with heat generation by partial combustion of the solids in the dry distillation reactor, a dry distillation gas duct is connected in the region of the solids supply means and so enters into a gasification zone, that the dry distillation gas flows through the particulate solids bed in the gasification zone in intimate contact with and in concurrent to the solids material.

From what follows it will become apparent to the person skilled in the art how to select from features A) and B) of the process and a) and b) of the apparatus that combination which is best suited to achieve the object of decreasing the content of condensable dry distillation volatiles in the product gas, depending on the materials and facilities available for the gasification.

This constricting pathway in the process (features A))as well as in the apparatus (features a)) serves to ensure that the embers bed in the lower region of the gasification zone is maintained in an ideal condition and configuration for intimate and prolonged contact between the downwardly moving embers bed and the gases still containing condensable dry distillation components which need to be removed by cracking at the high temperatures of the embers bed. The constricting pathway makes allowance for the decrease in volume of the particulate solids as they are being subjected to partial combustion and gasification reactions. At the same time the residence period of the embers bed before the discharge of the solids residues is prolonged to ensure that these solids are converted to the maximum extent and that the solids residues discharged are composed mostly of ash with a minimum of cinders still containing combustible or gasifiable carbon. Restricting the rate of discharge of the solids residues also slows down the gravitational descent of the upstream regions of the beds of solids being converted in the process and generator and generally assists in maintaining bed conditions favouring optimised conversion of dry-distillable/carbonisable and/or gasifiable carbonaceous solids as well as intimate contact with the gases passing trough the bed to achieve the desired conversion of undesirable high molecular weight condensable volatiles into a fuel gas substantially composed of lower molecular weight non-condensable gases and volatiles, i.e. more effectively than was possible in accordance with the prior art.

This controlled discharge of solids and intimate contact between solids and fuel gas is further promoted by the meandering pathway through and out of the solids bed right up to the final separation of the gas discharge from the solids being discharged. This feature will be further dealt with below.

Preferred embodiments provide that the fuel gas is withdrawn from the constricted pathway and then passes in counter-current heat exchange with gasification medium being fed into the gasification zone. This feature contributes to the important thermal balance of the process. It is important to conserve heat and employ it usefully in the process for the dry distillation, gasification and thermal cracking processes, since excessive heat losses have in the past made it difficult to maintain the temperature conditions required for achieving a high quality fuel gas.

What takes place in the embers bed according to the aforegoing is to a considerable extent complemented by process conditions in the dry distillation zone, see item B) and item b). If these process conditions are maintained such that the gas passing through the embers bed already has a relatively low content of condensable dry distillation volatiles, it becomes easier to remove any last traces thereof by cracking in the high temperature embers bed in the gasification zone. This can be achieved particularly effectively by certain preferred expedients of the process and apparatus.

In accordance therewith, gas containing oxygen is introduced in substoichiometrical amount for the partial combustion of the solids into the dry distillation zone in counter-current to the direction of conveyance of the solids which pass through the dry distillation zone in the form of a particulate solids bed under the action of gravity in such a manner that the solids are subjected to dry distillation and that in doing so dry distillation volatiles formed in the dry distillation zone are withdrawn from the dry distillation zone in the vicinity of the solids feed, from there to be passed into the gasification zone. In the gasification zone, the dry distillation volatiles flow in co-current to the carbonisable solids passing through the gasification zone. In accordance with the invention, due to the introduction of oxygencontaining gases into the dry distillation zone in counter-current to the direction of travel of the material to be converted and by reversing the gas flow in the gasification zone, through which the dry distillation volatiles flow in co-current to the carbonisable solids, the process of fuel gas generation is so split up that on the one hand, the dry distillation and on the other hand, the gasification are rendered separately controllable. The gas introduced into the dry distillation zone can be adjusted in respect of oxygen content and amount to the energy required for heating, drying and dry-distilling the organic solids in order to generate dry distillation volatiles. In the course thereof the dry distillation volatiles whilst flowing through the bed of particulate solids in counter-current to the direction of travel of the solids to be converted, are purified by the partial removal of high-boiling dry distillation volatiles which condense and are separated in the cold material beds in the particulate solids bed. The gasification zone following onto the dry distillation zone is independent of the dry distillation process and independent of the setting up of optimised dry distillation of the solids to the desired quality of the fuel gas to be generated. For that purpose solid matter, which is essentially substantially carbonisable or has already been carbonised is introduced into the gasification zone, non-gasifiable solids components which interfere with the control of the gasification process and the generation of high quality fuel gases are kept out of the gasification zone. In this manner, not only can the fuel gas quality be increased, but the constancy of the gas quality is also improved and major departures from optimal component contents in the fuel gas can also be avoided.

Performing the gas flow in counter-current to the main direction of travel of the particulate solids bed in the dry distillation zone offers important advantages as described more fully with reference to the drawings. To do so whilst operating the gasification zone in co-current, may be performed very conveniently in two separate reactor vessels, a first reactor vessel accommodating the dry distillation zone or a major part thereof and the second vessel accommodating the gasification zone. In that event, the first reactor vessel containing the dry distillation zone can be operated in such a manner that the solid carbonaceous content of the solids bed in the first reactor vessel is consumed entirely in the partial combustion, leaving behind, besides the dry distillation volatiles, only solids residues composed substantially of ash with little or no residual carbon. This is to be contrasted against the disclosure of DE 35 44 792 C2 where the solid residue of the degasification taking place in the degasification shaft furnace is essentially coke which, according to the example, is cooled before being charged into the gasification furnace. Another advantage of performing the process in two separate vessels resides in that the first reactor vessel can be charged with solids for dry distillation—even garbage or old motor vehicle tyres quite different from and in quantities largely independent of the solids charged into the second reactor vessel. However, again in contrast to the disclosure of DE 35 44 792 C2 the process, even with counter-current flow conditions in the dry distillation zone, may also be conducted in such a manner that the solids leaving the dry distillation zone are in the form of a carbonised embers bed which passes in that form directly into the gasification zone. This embodiment can quite readily be performed in a single vessel, provided it offers such a bed height that the gas flows inside the particulate solids bed can be split into an upward and a downward stream. The upper portion of the bed representing the dry distillation zone will then be run with the gas flow passing upwards in counter-current with the bed solids. The lower portion representing the gasification zone is operated with the gas flow therein passing downwards in co-current with the bed solids. The dry distillation volatiles of the dry distillation zone will be withdrawn from the top of the dry distillation zone and be reintroduced into the vessel at a level below the dry distillation zone in the gasification zone.

A further development of the inventive concept provides for the employment of the generator fuel gas, at least in part, for operating a gas motor or gas turbine generator unit for the generation of electrical energy. Of substantial importance is the utilisation of part of the electrical energy thereby generated for the electrolytic production of hydrogen as an optionally storable source of energy, oxygen thereby formed being re-admixed to the oxygen-containing gas to be introduced into the dry distillation zone and/or to the gasification medium to be introduced into the gasification zone. In this manner, an at least partly closed loop gas circuit is formed for the manufacture of fuel gas from organic solids, allowing at the same time the feed of nitrogen-containing air as required for the solids conversion to be reduced.

In order to act onto the particulate solids bed and for the continuous movement of the solids particles in the particulate solids bed and their intense mixing up the discharge element of the gasification reactor is preferably designed in a particular manner in the gas generator according to the invention. The discharge element is of conical or, preferably, pyramidal configuration, such that the cone or pyramid apex is upwardly directed opposed to the main direction of movement of the solids passing through the particulate solids bed and the cone surface or the side faces of the pyramid serve as sliding areas for the solids. Whenever movement takes place of the discharge element, in particular by rotation of the shaft to which the discharge element has been fitted, the solids particles in the particulate solids bed are then continuously moved about and rearranged so that bridgings in the particulate solids bed or channelling inclined to result in flame breakthrough between the solids particles are broken up. The pyramidal design of the discharge elements thus replaces material forwarding formations for the movement of the particle bed as is known, for example, from DE 197 55 700 A1. These known material advance members, in contrast to the pyramidal configuration of the discharge elements according to the invention, can be moved in the particulate solids bed only with considerable force. In addition, the discharge elements according to the invention have a simple construction. It is of advantage to employ as discharge elements a plurality of pyramidally designed fire grate elements, which, viewed in the direction of main advance of the solids, are arranged in the particulate solids bed in succession at different levels and which intensively rearrange the particulate solids bed at different levels. The formation of bridges and channelling in the particulate solids bed may then be avoided to a very considerable extent if for each fire grate element a different pyramidal configuration is selected, in particular, where each pyramid comprises a different polygonal plan view. In the simplest case two fire grate elements are provided to serve as the discharge element, one of the discharge elements having a square plan view, whereas the other has a hexagonal pyramidal plan view area Again many variations are possible. It will be understood that a conical shape may be regarded as a pyramid having an infinite number of pyramid side faces. If a pure cone shape is found to be too smooth to effect adequate agitation, rearrangement or advancing action on the solids bed, it is possible to apply any desired number of ribs or other protrusions or depressions to the cone surface. These may extend radially or obliquely, e.g. in a spiral pattern, the general rule being to achieve the desired effect on the bed with a minimum of force having to be exercised.

In an advantageous embodiment of the gas generator, a plurality of segments adapted to be connected up to one another in a gas-tight manner along connecting planes extending essentially normal to the main direction of movement of the solids to be converted, are provided for the connection in each case of an adjoining segment, at least in order to form the dry distillation and/or the gasification zone. Cavities required for the introduction or withdrawal of gases, in particular for the introduction of gasifying medium into the particulate solids bed are thus provided in the region of the connecting planes between the segments. This construction of the gas generator from individual segments permits to adapt the generator to whatever conditions may be required for an optimised conversion of the material to be dried, dry-distilled and to be gasified. If for dry distilling and, where applicable, prior drying of the solids, for example, longer periods of residence of the material are required in the dry distillation zone, it is possible to lengthen the particulate solids bed column in a simple manner by the stacking on of further segments. Changing of the throughput rate, once proved to be optimal in the gasification region and in the embers bed, is thus not required. The dry distillation and gasification may thus be controlled independently from one another by means of the segment dimensions. The geometric particulars of the segments in the actual direction need in this context not be uniformly dimensioned. The dimensions and design of the segments can be adapted to the solids to be processed as required for an optimal dry distillation and gasification process. The segments are, in particular, adaptable to the desired local regions for feeding the gasification means into the particulate solids bed and to the required throughput of the solids.

It is advantageous to utilise the individual segments for the configuration of the generator interior. In order to avoid channelling in the particulate solids bed or to break up channelling which may have formed, the segments, are preferably so dimensioned that in the main direction of movement of the material in the particulate solids bed constrictions are formed which constrict the cross-section of the particulate solids bed and/or provide expanded regions of the cross-section of the particulate solids bed. Such constrictions and expanded regions result in rearranging the solids during their passage through the dry distillation or gasification reactor. It may be advantageous to introduce suitable devices for such rearranging alone or in addition, in particular, flaps which are fitted to the segments so as to be pivotal in the particulate solids bed and which can be used for the localised rearrangements of the condition of the particulate solids bed and, in particular, for loosening up and breaking up material bridges which may have formed.

It is important to design the gas processor in such a manner that no flame breakthrough occurs in the particulate solids bed and that channelling which is inclined to lead to such flame breakrough can form only to a lesser extent and for short times. For this purpose, flame breakthrough obstructions and specially selected and dimensioned internals in the segments may be used, in particular, the installation of rotary or rocking fire grates or flaps serving as discharge element below the particulate solids beds in the dry distillation and/or gasification reactor. The design of such components depends on the nature of whatever material to be converted forms the particulate solids bed, in the first instance the lump size and composition. As regards the dry distillation reactor, it must also be borne in mind that in certain circumstances non dry-distillable solids residues need to be discharged from the dry distillation reactor, for example, metal residues, if plastics having metal wire inclusions are to be subjected to dry distillation. It also depends on the sizing of the solids in the gasification reactor, in which manner flame breakthrough obstructions and internals acting as discharge elements need to be dimensioned in order to attain in the gasification reactor a uniform throughput of dry distillation volatiles adapted to the desired generation of short-chain hydrocarbon and other non-condensable compounds and a correspondingly high fuel gas quality. In order to optimise the gasification reactor, it is, in particular, necessary, to match two process procedures to one another: firstly, the extensive gasification of the solids fed into the gasification reactor, secondly, the cracking process in the embers bed. This primarily determines the quality of the fuel gas generated in the gas processor. The fuel gas generation may thus be optimally adapted to the solids to be processed by the adaptation of specifically designed segments of the gas generator. The dry distillation and gasification zone may thus be regulated independently from one another in accordance with whatever processes take place in the zones.

Of particular importance for this purpose is the design of the discharge element which supports the particulate solids bed and which discharges underneath the particulate solids bed the solids residues not converted in the gasification reactor. The purpose of such a discharge element is to so control the discharge of residues and of generated fuel gas that the solids throughput is adapted to the temperature required in the embers bed and can be optimised to the amount and quality of the fuel gas generated. The residues are to be discharged in a particular degree of fineness, there being prescribed a maximum particle size, and the discharge of the residues and the withdrawal of the fuel gas generated can be controlled separately. Thus, provision may be made to so provide a baffle formation in the discharge region for the discharge of solids residues that the solids discharge is limited to a maximum solids particle size and that for the fuel gas flowing out a gas passage is provided which has the effect that the solids residues to be discharged and the fuel gas being generated, can be withdrawn from the gasification reactor separately. In order to adjust the maximum solids particle size, it is advantageous to fix the baffle formations to the bottom of a discharge element, the level of which is adjustable. Preferably, at least one passage is provided for the free through-flow of the fuel gas between the bottom of the discharge element and the baffle formation.

In order to facilitate the controlled discharge of the solids residues, the baffle formation is preferably composed of a plurality of solids guides which, viewed in the direction of discharge of the solids residues, follow each other successively. For the free throughput of the fuel gas this design provides for at least one through-flow passage in the region of the last one of these solids guide means. Between the solids guide means throughput advancing formations for the solids residues are mounted, which by turning over the solids in the discharge region and, where necessary, also by breaking up of agglomerations of solids particles accelerate the discharge. For moving the discharge element the discharge element is fitted to a rotatable drive shaft.

For the feeding of gas, in particular, gasification media or for the withdrawal of fuel gas from the gasification reactor, provision is made for the drive shaft by which the discharge element is subjected to rotary movement to be designed as a hollow shaft. Advantageously, in particular the generated fuel gas is withdrawn through the shaft in an upward direction from the gasification reactor. This is particularly appropriate if the shaft is mounted in the overhead region of the gasification reactor.

BRIEF DESCRIPTION OF THE DRAWINGS

The invention and further appropriate embodiments of the invention will in the following be further explained by way of working examples The drawings more specifically show in:

FIG. 4 a longitudinal section of a dry distillation reactor according to section line IV—IV according to FIG. 5, FIG. 5 a cross-section through the dry distillation reactor according to FIG. 4 along section line V—V, FIG. 6 a detailed view of a dry distillation reactor according to FIG. 4 according to section line VI on a larger scale, FIG. 7 a gasification reactor in axial longitudinal section FIG. 8 a cross-section of the embodiment according to FIG. 7 sectionalised along section line VIII—VIII, FIG. 9 a cross-section of the embodiment according to FIG. 7 sectionalised along section line IX—IX, FIG. 10 a detailed view of a gasification reactor according to FIG. 7 showing the rotary fire grate and cinders discharge region in longitudinal section along section line X—X according to FIG. 11, FIG. 11 a transverse section of the embodiment according to FIG. 10 along section line XI—XI, FIG. 12 a further embodiment of a gasification reactor having a central fuel gas withdrawal duct, FIG. 13 a detail of a gasification reactor according to FIG. 12 with the rotary fire grate and cinders discharge region in longitudinal section according to section line XIII—XIII according to FIG. 14, FIG. 14 a transverse section of the embodiment according to FIG. 13 along section line XIV—XIV, FIG. 15 a view similar to FIG. 7 of yet another embodiment of a gasification reactor, FIG. 16 a reverse plan view of portion XVI in FIG. 15, FIG. 17 a detail view on a larger scale in vertical broken away section of a modification of the rotary fire grate and cinders/ash discharge region in FIG. 15, FIG. 18 a reverse plan view of portion XVIII in FIG. 17, FIG. 19 a plant for the generation of fuel gas and the production of hydrogen.

DESCRIPTION OF SPECIFIC EMBODIMENTS

Figure 1:
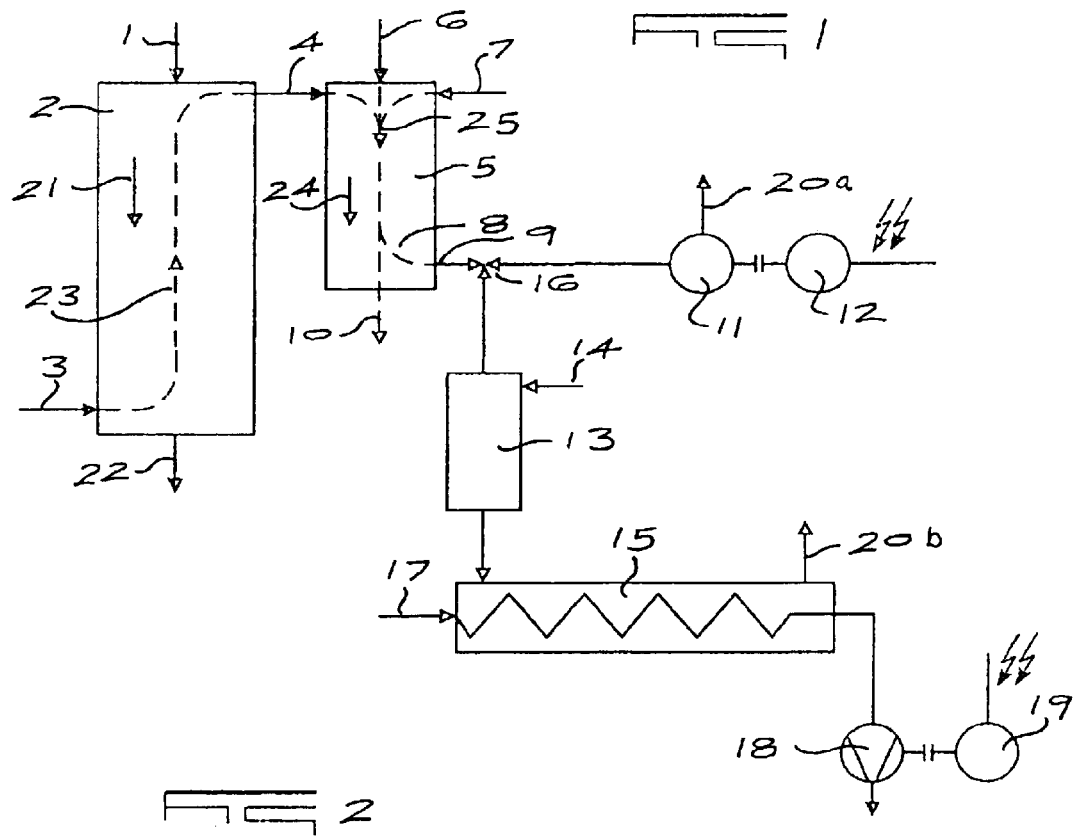
FIG. 1 a flow diagram of an embodiment of a process and apparatus for the generation of fuel gas, using a first reactor vessel for accommodating the dry distillation zone and a second reactor vessel for accommodating the gasification zone.

In FIG. 1 the process according to the invention is illustrated by way of a flow sheet. The solids to be gasified having organic material contents, in the working example dry-distillable biomass such as, e.g., waste wood, straw bales or even bio-garbage which is difficult to rot or plastics containing metal such as wastes from metal reinforced insulating materials or old tyres are introduced by way of a solids feed 1 into a dry distillation reactor 2 and are there heated, dried thereby and subjected to dry distillation. The solids are heated in the dry distillation reactor by partial combustion of the organic material contents with the addition of gasification medium which, in relation to the oxidisable solids content of the introduced solids, is added in substoichiometrical amount The gasification medium flows by way of a gasification means supply 3 into the dry distillation reactor 2.

The dry distillation volatiles formed in the dry distillation reactor 2 by heating of the organic solids are withdrawn as a raw gas from the dry distillation reactor by way of a dry distillation volatiles line 4 and are transferred into a gasification reactor 5, charged with gasifiable material, in particular, carbonisable solids or coke or charcoal. The gasifiable material for the gasification reactor must be suitably selected for the gasification process to be conducted in the gasification reactor. The material as regards its gasification properties should be as homogeneous as possible and should be fed with an approximately uniform particle size as is the case, for example, with shredded wood or wood off-cut wastes, wood chemically still untreated from carpentry workshops, shredded hedge or forestry wastes or nut shells, in particular, ground nut shells or olive pips. For purposes of conversion of the introduced dry distillation volatiles, it is desirable that the highest possible specific surface area should be offered to the volatiles by the material in the gasification space. The gasifiable solids are fed into the gasification reactor by way of a material lock device 6.

In addition to dry distillation volatiles, gasification media as well are introduced into the gasification reactor 5. For that purpose a gasification medium feed duct 7 is connected to the gasification reactor 5. As is the case in the dry distillation reactor 2, the gasification media are introduced in a substoichiometrical ratio to the oxidisable contents of the gasifiable material such that combustion of a portion of the introduced solids also takes place in the gasification reactor 5. This causes the formation of an embers bed in the outlet region 8 of the gasification reactor. The fuel gas generated in the gasification reactor 5 is drawn through the embers bed, for which purpose a fuel gas duct 9 is connected to the gasification reactor. For the withdrawal of ash and non-gasified solids residues an ash and cinders outlet 10 is provided. The material properties of the gasifiable materials fed into the gasification reactor are to be selected primarily with a view to the formation of this embers bed through which the fuel gas is to flow. The embers bed must be of uniform structure, and, the more homogeneous the feed material, the more homogeneous will be the embers bed obtained. Components in the material which would interfere with the homogeneity of the embers bed must be avoided. This applies, for example, to wire residues in the material, but also to material components which at temperature above 800° C. in the embers bed are inclined to fuse such as e.g. silicates, which can agglomerate and bake together and which can interfere with the desired optimal structure of the embers bed as well as with the discharge of the ashes from the gasification space of the gasification reactor. In accordance with the process according to the invention, such materials should not be introduced into the gasification reactor 5 but into the dry distillation reactor 2 and will there serve for the generation of dry distillation volatiles which are then introduced as a raw gas into the gasification reactor there to be converted into fuel gas.

For the utilisation of the generated fuel gas two alternatives are provided in the working example according to FIG. 1. On the one hand, it is possible by combustion of compressed fuel gases in a gas motor or as in the working example in a gas turbine 11 which drives a generator 12, to generate electrical energy; on the other hand, a heat carrier may be heated by combustion of the fuel gas in a combustion chamber 13 with an air feed 14 and an appropriate heat exchange between hot combustion gas from the combustion chamber and a heat carrier in a heat exchanger 15 downstream of the combustion chamber 13. The utilisation of the generated fuel gas can be controlled depending on energy requirements by way of a control valve 16 in the fuel gas duct 9. If water is converted into steam in the heat exchanger 15, as provided for in the working example by the connection of a water line 17 to the heat exchanger 15, the steam thus generated can also be fed as a working medium to a steam turbine 18 which serves for driving a generator 19.

In both utilisation alternatives the exhaust gas flows by way of an exhaust duct into the environment, thus from the gas turbine 11 by way of an exhaust duct 20a or from the heat exchanger 15 by way of an exhaust gas duct 20b in which, if desired or required, waste gas purification means may be employed.

Important features for the invention arm the gas pathways in the dry distillation reactor 2 and in the gasification reactor 5 as well as the segmental construction of these two reactor.

The organic solids to be converted pass through the dry distillation reactor 2 as a particulate solids bed under the action of gravity in the direction of gravity 21 from the top downwards. This direction of movement is denoted as the main direction of movement of the solids. During its movement through the solids particle bed the solids are heated, dried and dry-distilled. The not dry-distilled solids residues are combusted. The ashes formed thereby and the non-combustible solids components such as wire scraps emerge from the lower end of the dry distillation reactor at a discharge locality 22. In counter-current to this direction of conveyance of the solids in the solids particle bed in the direction of gravity 21, the dry distillation volatiles formed in the dry distillation reactor pass through the dry distillation reactor 2, being formed by heating the solids particle bed due to the combustion of part of the solids. In FIG. 1 the flow of the dry combustion volatiles in the direction of flow 23 is denoted by broken lines. This direction of flow 23 of the dry distillation volatiles in the particulate solids bed is dictated by the feed 3 of gasification medium into the lower region of the dry distillation reactor and the withdrawal of dry distillation volatiles in its uppermost region by way of the dry distillation volatiles duct 4. The gasification media flowing in through the gasification media feed means 3 and resulting in the combustion of part of the solids permeate the solids particle bed from below in an upward direction. The combustion of the solids in the dry distillation reactor takes place predominantly in the lower portion of the particulate solids bed above the withdrawal position 22 for the combustion residue. The gases so heated and flowing through the particulate solids bed heat up the organic solids to dry distillation temperature, in the working example to about 750° C. The dry distillation volatiles formed are passed in the direction of flow 23 upwards through the particulate solids bed and thereby flow through the colder beds of particulate solids in the dry distillation reactor so that higher boiling high molecular weight components in the dry distillation volatiles are at least partly separated off by condensation on the solids. As the cold particulate solids travel progressively downwards, these higher molecular weight dry distillation volatiles condensed thereon re-enter the regions where partial combustion of the solids takes place. The condensed volatiles are thus subjected once again to relatively intense heat treatment whereby they are at least in part combusted together with the solids and also subjected to a degree of cracking: These effects contribute to the reduction of the condensable volatiles content in the dry distillation gas.

In addition, the dry distillation volatiles may be withdrawn substantially ash- and dust free. Accordingly, a high quality dry distillation gas flows from the dry distillation reactor 2 as a raw gas having a comparatively high content of low molecular weight hydrocarbons.

Non-condensed high molecular weight hydrocarbon contents and other condensable volatiles such as phenols, amines, fatty acids, in particular formic acid and alcohols, still present in the dry distillation gas are subsequently cracked when flowing through the gasification reactor 5 at high temperature, in the working example at a temperature between 950°/1050° C. in the embers bed in the discharge region 8 of the gasification reactor. As a result, a readily ignitable fuel gas mixture of high quality is generated in the gasification reactor from the dry distillation volatiles jointly with the gases which are formed by gasification of the feed materials to the gasification reactor, e.g. coke or charcoal or shredded wood which itself gives rise to dry distillation volatiles besides gasification products.

In the gasification reactor the gasifiable material introduced by way of the material lock 6 as well as the dry distillation gas to be converted and the gasification media flowing in by way of the gasification media feed line 7 are passed in co-current—in contrast to the counter-current conditions in the dry distillation reactor 2—. In doing so the solids pass through the gasification reactor 5 as a particulate solids bed in the direction of gravity 24 and the gases flow parallel thereto in the direction of flow 25 through the interstitial open voids between the solids particles of the solids particles bed. The flow path of the gases in the gasification reactor 5 is diagrammatically indicated in FIG. 1 by dash-dotted lines.

Figure 2:
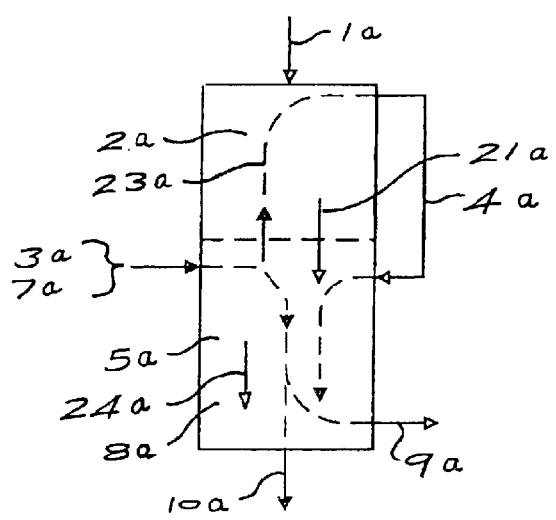
FIGS. 2 and 3 represent flow diagrams of two further embodiments of a process and apparatus for the generator of fuel gas using a single reactor vessel accommodating both the dry distillation zone as well as the gasification zone.

Referring now to FIG. 2, the process according to FIG. 1 is here diagammatically shown to be performed in a single reactor vessel, including in its upper portion the dry distillation zone 2a and in its lower portion the gasification zone 5a, the approximate boundary between the two zones being indicated by a horizontal broken line. All items equivalent to items in FIG. 1 have the same reference numbers with an "a" added thereto. It will be seen that the feed of oxygen containing gasification medium 3a, 7a enters near the boundary between the two zones and serves both for partial combustion to provide the dry distillation in zone 2a as well as for gasification in the thermal cracking zone 5a. The dry distillation gases travel upwards in zone 2a in counter-current to the solids la which travel downwards under gravity 21a, 24a. The hottest region of the embers bed is denoted as 8a. The dry distillation volatiles are withdrawn by a gas extractor at the top of zone 2a and returned into the gasification zone 5a via duct 4a. The fuel gas is withdrawn at 9a and forwarded to any desired further use as in FIG. 1.

Figure 3:
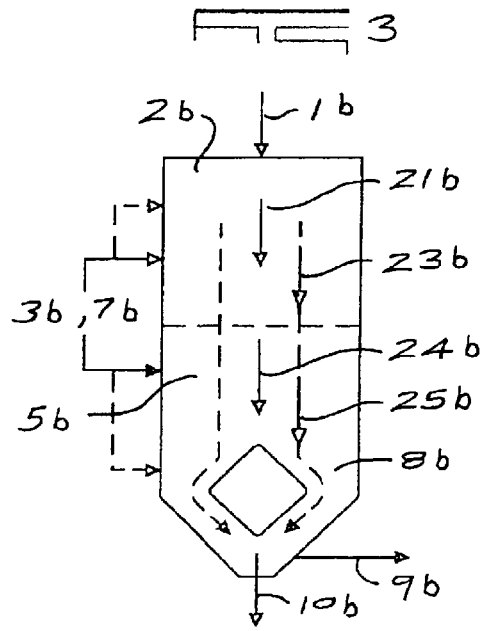

Referring now to FIG. 3, all items equivalent to those in FIG. 1 and 2 have the same reference numbers with a "b" added thereto. In this embodiment The same oxygen-containing gas introduced at different levels provides partial combustion to achieve dry distillation in zone 2b as well as gasification in zone 5b and a high temperature embers bed at 8b entering the constricting pathway between the side edges and underside of a diamond-shaped discharge element and the funnel-shaped bottom of the reactor vessel 2b, 5b. All gas flows are downward in co-current with the solids in the direction of gravity 21b. The fuel gas is withdrawn at 9b and passed to further use.

It is preferred to employ the indicated features of the gasification zone 5b, 8b according to FIG. 3 also in the gasification zone 5a, 8a of FIG. 2 and in the gasification reactor vessel 5 of FIG. 1. These features will be described more filly with reference to FIGS. 7 to 14.

A working example for the construction of the dry distillation reactor 2 is illustrated in FIG. 4 and a working example for the gasification reactor 5 is schematically shown in FIG. 7.

FIG. 4 shows a dry distillation reactor 2 having a reactor shaft 26 of square cross-section. In FIG. 5 the dry distillation reactor is shown in cross-section along sectional line V—V in FIG. 4. The solids to be converted in the dry distillation reactor are fed into the dry distillation reactor by way of the solids feed means 1. The solids pass in batches into the interior of the shaft reactor 26, being first introduced into a material lock chamber 27 through opened exterior lock gate 28. After closing of the lock gate 28, air contained in the lock chamber is sucked off. Thereafter an inner lock gate 29 can be opened and the solids can be introduced into the shaft reactor 26. In order to introduce further solids, the inner lock gate 29 is closed again and the gas entered into the lock chamber 27 from the shaft is sucked off. Thereafter the outer lock gate 28 may be opened for a new batch of solids to be introduced.

The solids pass through the reactor shaft. in the form of a particulate solids bed 30 as illustrated diagrammatically in FIG. 4. The particulate solids bed is supported by a fire grate element 31 serving as a discharge element, provided in the lower region of the shaft reactor 26. The fire grate element has a prismatic configuration and is fitted as a rocking grate being pivotal in the dry distillation reactor about a horizontally extending axis 32. It is moved so as by rocking motion to discharge the solids residue still remaining from the bed of particulate solids after dry distillation and combustion, i.e. ashes or cinders.

The dry distillation reactor 2 is composed of individual segments 33, 34, 35 which enclose the shaft space and which for the formation of the shaft reactor 26 are stacked onto one another in a gas-tight manner. For that purpose the segments comprise connecting elements 36 which fit one another in their connecting planes, extending transversely, more particularly, essentially normal to the main direction of movement of the solids to be converted in the particulate solids bed, that is horizontally in the working example. The connecting elements of all segments are of uniform design. As for the remainder each segment, however, is designed in accordance with the technical objective it is to meet. Thus, the segments 33 and 34 comprise flaps 38, 39 which are pivotal in the shaft reactor 26 about axes 37, which are operable by drive means 40 (see FIG. 5) provided outside the shaft reactor. The axes 37 in the working example are provided in the same manner as the axes 32 extending horizontally. In large scale dry distillation reactors the flaps 38, 39 are driven by motors. The flaps serve for loosening up and for supporting the movement of the particulate solids bed, if necessary for breaking up of solids bridges formed in the particulate solids bed which interfere with the conveyance of the solids in the particulate solids bed or with the discharge of solids residues from the interior of the shaft reactor 26 in the region of the grate element 31. The flaps 39 in the middle segment 34 essentially support the material movement in the particulate solids bed; by means of the flaps 38 in the region of the grate element 31 it is possible, if desired or required, to also discharge still uncombusted bulky material residues of the material subjected to dry distillation.

The structure of the particulate solids bed is of great importance for a uniform dry distillation of the solids. The gases heating up the solids must pass through all regions of the particulate solids bed in a uniform manner such that the solids are converted, i.e. dry-distilled, as completely as possible and are combusted in the lower region of the shaft in order for only non-combustible solids residues to remain, which can be discharged from the dry distillation reactor without interference, if desired or required, with the actuation and support of the flaps 38 and the grate element 31. The solids residues emerge through the outlet gap 41 between the grate element 31 and flaps 38 into a residue space 42 in the bottom 43 of the reactor and, in the working example drop into an ashes box 44 which in FIG. 4 is illustrated schematically and only in part.

In the working example the gasification medium, generally air, is introduced into the particulate solids bed 30 in the shaft reactor 26 by way of and through its shaft internals which serve for the movement of the particulate solids bed in the shaft and for supporting the discharge of the non dry-distilled and combusted solids residues in the shaft. Both the grate element 31 as well as the movable flaps 38 and 39 are designed hollow and comprise gas feed means 45 of identical design, each extending parallel to their axes 32 and 37 respectively as well as in their interior gas spaces 46 in the grate element 31 and gas spaces 47 inside the flaps 38, 39 and discharge apertures 48 in the grate element 31 or, as the case may be, discharge apertures 49 in the flaps 38, 39 through which the gasification medium is introduced into the particulate solids bed 30. By way of the discharge aperture 49 in the flaps 38, the gasification medium flows at the outlet gap 41 in the region of the lower edge of the grate element 31 from below into the particulate solids bed 30, as indicated in FIG. 4 by flow arrows 50. Gasification medium is introduced centrally into the particulate solids bed 30 by the grate element 31 by way of its discharge apertures 48 which in the working example are shown in the upper region of the grate element 39 and by way of the outlet apertures 49 in the flaps 39. By moving the flaps 39 the introduction of the gasification medium may also be locally varied depending on requirements.

When feeding the gasification medium by way of the grate element 31 and the flaps 38 and 39 a cooling of the grate element and the flaps in the hot particulate solids region is attained simultaneously with the central feeding of the gasification medium into the particulate solids bed.

The dry distillation volatiles flow out of the shaft reactor 26 in the upper region thereof by way of the dry distillation gas duct 4 there connected into the gasification reactor 5.

The combination possibilities afforded by and the mutual interchangeability of the segments 33, 34, 35 in view of their uniformly designed connecting elements 36 in the connecting planes and an interchangeable design in the axial direction in the dry distillation reactor provide for an optimal adaptability of the dry distillation reactor 2 to various required conditions for the conversion of the solids to be dry-distilled. In particular, the height of the shaft reactor may be varied in a simple manner or a segment having a straight shaft wall, as provided in the working example by the segment 35, may be exchanged against a segment equipped with movable flaps for supporting the movement of the particulate solids bed as is possible in the working example with the segment 34. In the working example according to FIG. 4 gas ducts 51 are in addition provided in the region of the connecting elements 36, which, for example, may serve for feeding further gasification media, in particular, air but also air enriched with oxygen or may in a different manner, not illustrated in the working example, serve for the withdrawal of generated dry distillation gases. All connecting elements are in this context so designed that, when stacking the segments, gas-tight connections are attained.

In FIG. 6 a detail of the dry distillation reactor 2 according to FIG. 4 along section line VI for one of the connecting elements 36 is illustrated on a scale enlarged by comparison with FIG. 4. In the working example each segment is composed of chamotte blocks 52, 53, 54. Depending on the size and circumference of the reactor shaft a single segment may be formed from a single chamotte block providing a rectangular shaft cavity or from a plurality of adjoiningly arranged chamotte blocks together outlining the periphery of the shaft interior. In the working example each segment corresponding to the square cross-section of the shaft reactor 26 encompassing the interior of the shaft reactor 26 to be charged with solids, see FIG. 5. Each segment is surrounded by wall portions 55, 56, 57 which shut off the dry distillation reactor 2 from the outside in a gas-tight manner. The wall sections conventionally consist of steel sheet As shown in FIG. 6, the chamotte blocks 52, 53, 54 are each fitted to the wall sections 55, 56, 57 on equally configured brackets 58 at a horizontal distance 59 from the vertically extending wall portions so that between the chamotte blocks on the inside and the wall sections on the outside a gap 60 remains for each segment. This gap permits a mutual tension-free thermal expansion of chamotte blocks and wall sections in relation to one another having regard to their different coefficients of thermal expansion and which expand differently at the operating temperature of the dry distillation reactor. Moreover, the gap 60 being an intermediate gas space, provides thermal insulation.

The support brackets 58 of the segments, in the working example, form part of the connecting elements 36. The chamotte blocks 52, 53, 54 of the segments are so fixed to the support brackets 58 that when stacking and mutually connecting the segments a vertical spacing and free space 61 between the chamotte blocks and the adjoining segment remains. In this manner undesirable pressure onto the chamotte blocks is avoided. The chamotte blocks are placed onto the brackets 58 in a gas-tight manner. Between the support brackets and the chamotte blocks a fire-resistant seal 62 is in each case provided, for example, a chamotte material having plastic properties.

In the working example the gas-tight sealing of the connecting elements 36 when stacking the segments 33, 34, 35 is attained by gasket elements 63 between the outer wall sections 55 and 56 and 56 and 57 respectively. For this purpose connecting flanges 64, 65 are provided on the wall segments between which the sealing gaskets 63 are inserted. The connecting flanges 65 are fitted to the brackets 58, see FIG. 6. The sealing of the segments in the connecting elements 36 by the fire-resistant sealing means 62 and by means of the sealing gaskets 63 takes place in such a manner that not only the interior of the shaft reactor 26 is sealed against the outside, but that also all intermediate cavities 60 between the inner chamotte blocks and the exterior wall sections are sealed in relation to one another. In this manner the formation of vertical gas flows along the cool exterior walls of the dry distillation reactor from one segment to the other is avoided, which could impair the desired process performance in the dry distillation reactor substantially. In the working example the brackets 58 to which the connecting flanges 65 are fitted, are welded to the wall segments 55, 56, 57 in a gas-tight manner. The intermediate cavities 60 are by this design thus closed off in a gas-impervious manner in each connecting plane of a segment. As for the remainder, the intermediate cavities 60 are open, however, so that, if desired or required, gas entering these intermediate cavities between the wall sections and the chamotte blocks or optionally barrier-forming air additionally introduced by way of the gas ducts 51, can re-enter the interior of the shaft 26 by way of the free cavities 61, see flow arrows 66.

In the working example the bottom 43 of the reactor is likewise formed out of chamotte blocks. The chamotte blocks are so shaped and arranged that the residue space is provided with a downwardly constricting cross-section so that solids residues leaving the shaft reactor 26 slide over downwardly sloping chamotte block walls into the ashes box 44. The bottom 43 of the reactor comprises a connecting flange 67 for the stacking and connection of the lowermost segment 33 designed in the same manner as any one of the connecting flanges 64 of the segments.

As regards the gasification reactor 5, which can either be used alone (FIGS. 2 and 3), or which is to be set up downstream of the dry distillation reactor 2 according to certain embodiments of the process of the invention (FIG. 1) a working example is illustrated schematically in FIG. 7 in longitudinal section. Details of the gasification reactor are shown in FIGS. 8, 9 as well as on a larger scale in FIGS. 10, 11. The cross-section of this gasification reactor is circular and the design is essentially axially symmetrical. The gasification reactor comprises a large number of apparatus components, designed in a similar manner as in the case of the dry distillation reactor 2, in particular, as regards the connecting elements in the connecting planes of the segments for assembling the reactor shaft as well as the material feed and the ash withdrawal means. Thus, the material lock means 6 of the gasification reactor, which in the working example enters sideways into the upper region of the gasification reactor, includes a material lock chamber 68 having two lock gates, an exterior gate 69 and an interior gate 70 which are movable independently from one another and which close the lock chamber in a gas-tight manner and thereby permit air having entered the lock chambers 68 during the feeding of material when the exterior lock gate 69 is open or dry distillation gas having entered the lock chamber 68 whilst the inner lock gate 70 is open to be sucked off, all this in the same manner as for the solids feed means 1 of the dry distillation reactor.

Inside the cylindrical interior 71 of the gasification reactor 6 the introduced material to be gasified once again forms a particulate solids bed, which in the working example is supported by a grate 73, acting as the discharge element, rotatable about an axis 72. In the working example this axis 72 is also the axis of symmetry of the gasification reactor. For rotation a drive shaft 74 is fitted to the rotary grate, which is conducted upwardly out of the gasification reactor and hence is drivable by way of a gear drive means, not shown in the drawing, about the axis 72 in the direction of rotation 75. The movement may take place continuously or stepwise. The rotary grate 73 is provided in the gasification reactor underneath a constriction 76 formed in the interior 71 which radially constricts the particulate solids bed in the shaft reactor. Such constrictions effect a rearrangement of the particulate solids material and avoid bridge formations and undesirable channelling in the particulate solids bed, which would result in inhomogeneous gasflows in the particulate solids bed and in uneven conversion of the material to be gasified, so that possibly locally limited regions of the particulate solids bed may burn through without contributing anything to the gas generation.

As in the case of the dry distillation reactor, for assembling the gasification reactor stackable segments 78, 79 adapted to be stacked onto a segment base 77 by way of connection planes, which once again are essentially normal to the main direction of movement of the solids in the particulate solids bed, i.e. extending horizontally, are provided with connecting elements 80 of the same nature. Accordingly, the segments of the gasification reactor as well are mutually interchangeable so that the gasification procedures in the gasification reactor can be optimised and adapted to the required conditions for generating a high-quality fuel gas, that the desired cracking of high molecular weight hydrocarbon components in the dry distillation gas takes place as well as a gasification as complete as possible is attainable of the materials introduced in the form of a particulate solids bed. In the working example the segment 79, for example, for constricting the particulate solids bed in the interior 71 and for the formation of a constriction 76 comprises an inwardly directed region 81, where the material is thicker. This segment, in the event that the constriction 76 should for specific application conditions be provided in a different position, for example, farther down in the interior 71, can be interchanged with a segment having straight interior walls, for example, against a segment 78, or there may, in addition, be provided a further segment for forming a second constriction. Accordingly, the interchangeability of the segments based on their equally designed connecting elements 80 results in a high variability in the technical design of the gasification reactor 5.

In the case of the gasification reactor 5 as well the segments 78, 79 in the working example comprise tubular chamotte blocks 82, 83, each being placed, radially spaced, for the formation of an intermediate cavity 84 between an outer annular wall segment 85, 86 and chamotte blocks 82, 83 on support brackets 87 in a gas-tight manner by means of refractory sealing means 88 so that the intermediate cavities 84 are sealed off in a gas-tight manner. Differences in thermal expansion between the chamotte blocks and metallic wall sections are accommodated by their being spaced apart by way of the intermediate cavities, the intermediate cavities 84 in addition provide thermal insulation. The connecting elements 80 are designed analogously to the connecting elements 36 of the dry distillation reactor 2. For gas-tight sealing between the stacked segments the connecting elements 80 once again comprise connecting flanges 89 with gaskets 90 provided between the flanges.

In the working example the segment base 77 is designed, with regard to its wall structure, in the same manner as a segment 78 or 79. It comprises chamotte blocks 91, encompassing the interior 71 in the lower region of the gasification reactor 5 and being arranged in spaced apart relationship from the outer wall segments 92 so that in the segment base as well an annular cavity 93 is brought about between outer wall sections 92 and chamotte blocks 91. The wall sections 92 are fitted to the bottom 94 of the gasification reactor. In the working example the spacing between the chamotte blocks of the segment 77 and its wall sections 92 corresponds to the spacing between the chamotte blocks 82, 83 and the wall sections 85, 86 of the segments 78, 79. On the segment base 77, for the gas-tight connection of the first segment to be stacked onto the segment base, i.e. of segment 78 in the working example, a connecting flange 95, identical to the connecting flange 89 of a connecting element, is fitted to the upper base edge.

Likewise, on the reactor head 96 of the gasification reactor 5 a connecting flange 97 corresponding to the connecting flanges 89 of the connecting elements is provided, serving for the connection of whatever is the last one of the stacked segments, i.e. segment 79 in the working example. Accordingly, any one of the segments of the gasification reactor may be connected to the segment base 77 and reactor head 96 in the same manner as to any one of the remaining segments.

In order to improve the gas tightness of the intermediate cavities 84 in relation to the reactor interior (e.g. in the event of cracks forming in the chamotte), it is preferred for the outer periphery of the chamotte lining to be provided with a gastight covering of any suitable material, e.g. of sheet metal. To compensate for thermal expansion differences a gap may be provided as well between such covering and the chamotte block, provided that access of air or other gaseous medium to such gap is blocked off in any suitable manner, e.g. by resilient seals resistant to the temperatures there prevailing being provided at the top and bottom of the gap between the chamotte block and the cover or in any other manner.

Instead of chamotte it is possible to employ any alternative suitably refractory material.

What is taught in the preceding two paragraphs in connection with reactor 2 applies equally to reactor 1.

The wall thickness of the chamotte blocks or other refractory blocks is selected according to two criteria: the desired heat insulation effect and the desired heat storage capacity. The greater the thickness the greater will be the heat storage capacity. A high heat storage capacity prolongs the time required for heating up the apparatus. On the other hand, a high heat capacity enhances temperature stability under variable throughput rates. It also permits operating the reactor temporarily under very low load or even zero load conditions and resumption of normal load operating conditions without serious drop in temperature.

In the region of the rotary grate 73 an embers bed 98 encompassing the particulate solids bed around the rotary grate 73 in an annular fashion is generated in the interior 71 of the gasification reactor by the introduction of gasification media into the particulate solids bed. The gasification medium in the working example essentially enters the particulate solids bed through the rotary grate 73. For this purpose the rotary grate as well as its drive shaft 74 are of hollow design and comprise gas passages 99, 100 and gas chambers 101, 102 as well as apertures 103 at the gas chamber 102 for gas discharge therefrom. The gas feed passage 99 passes through the hollow interior of the drive shaft 74, the gas passage 100 interconnects the gas chambers 101, 102 of the rotary grate 73. The gas flow in the gas passages and gas chambers is indicated by flow arrows 104. In the gas passage 99 the gasification medium is introduced by way of the gasification medium feed duct 7 which is not shown in FIG. 7. The gasification medium first flows from the gas passage 99 through the gas chamber 101 in order to there cool the rotary grate 73 in the region of the embers bed 98 in the particulate solids bed. The apertures 103 for the discharge of the gasification medium from the gas chamber 102 are provided above the embers bed 98. The temperature in the embers bed is controlled by way of the gasification medium feed. In the working example a temperature of about 1000° C. is set up in the embers bed, at which temperature even high molecular weight hydrocarbon components in the dry distillation volatiles are cracked.

Gasification media are also admitted to the gasification reactor 5 in the region of the connecting elements 80 along the connecting planes of the segments. In analogy to the connecting areas of the segments of the dry distillation reactor pipe ducts 105 also enter the gasification reactor in the intermediate cavities 84, 93 between the chamotte blocks 82, 83, 91 and external wall segments 85, 86, 92. The pipe ducts 105 are connected to the gasification media duct 7 by manifold ducts 106. The manifold ducts 106 are illustrated only schematically in FIG. 7. The gasification media enter into the interior 71 of the gasification reactor 5 through cavities 107 (the flow of the gasification medium is once again indicated by flow arrows 108). The cavities 107 are in each case provided at the connecting localities between the segments 78, 79 on the one hand, and the connecting localities of the segments on the segment base 77 and to the reactor head 96 between the chamotte blocks 82, 83, 91 and the support brackets 87 of the respective adjoining segment 78, 79, respectively the segment base 77 or the reactor head 96. The overall amount of gasification media is introduced in relation to the gasifiable solids content of the material to be gasified in the particulate solids bed in a substoichiometric ratio in order to produce high-quality fuel gas. The dry distillation volatiles to be converted flow into the gasification reactor 5 by way of the dry distillation duct 4 which in the working example enters into the reactor head 96.

The rotary grate 73 acting as a discharge element in the working example comprises two grate elements 109, 110 which, as part of the rotary grate, viewed in the direction of main movement of the solids, are mutually vertically spaced apart and succeed each other in the particulate solids bed at different levels. The grate elements 109, 110 thus influence the material conveyance in the particulate solids bed at two action levels. The exterior configuration of the grate elements is apparent from FIGS. 8, 9 representing transverse sections along section lines VIII—VIII and IX—IX according to FIG. 7. In the working example the grate elements 109, 110 are of pyramidal configuration. Their configurations differ one from the other: the grate element 110 has the shape of a pyramid of square plan view, FIG. 8, the grate element 109 forms a pyramid which is hexagonal in plan view, FIG. 9. In both grate elements 109, 110 the pyramid apexes are upwardly directed in the reactor shaft interior, where they merge into tubular collars 111, 112, on the one hand serving for the interconnection of the grate elements to one another and in the other case for connection to the drive shaft 74, see FIG. 10. Thus, the collar 111 of the grate element 109 is fixed to the bottom 113 of the grate element 110, thereby being arranged radially spaced in relation to the drive shaft 74, whereby between the collar 111 and the exterior surface of the shaft a gap is formed for providing the gas passage 100 interconnecting the gas chambers 101, 102. The collar 112 of the grate element 110 is welded to the drive shaft 74.

When turning the drive shaft 74 the solids particles in the particulate solids bed are moved by the grate elements 109, 110 whereby, in particular, material bridges or channelling in the particulate solids bed, which promotes flame breakthrough in local regions of the particulate solids bed, are broken up. In particular, the grate element 110, provided above the embers bed 98, thus acts as a means for blocking flame breakthrough in the particulate solids bed.

The pyramidal configuration of the grate elements replaces in an advantageous manner grate elements having stirrer arms or worm volutions moved inside the particulate solids bed as are known, for example, from DE 197 55 700 A1. As compared with these known means for providing movement of the particulate solids bed the pyramidal grate elements according to the invention provide the additional advantage that they form hollow bodies and are cooled by the gasification media which are introduced through the hollow bodies into the particulate solids bed. Cooling of the grate elements is necessary particularly where in the region of the grate elements a high temperature embers bed is created.

Below the rotary grate 73 the fuel gas duct 9 for the withdrawal of the generated fuel gas is connected and also the discharge region for discharging the solids residues from the gasification reactor 5 is formed. For the ashes discharge, which in FIG. 1 is denoted diagrammatically by the reference symbol 10, a central aperture 115 is provided in the funnel-shaped shaft bottom 114. The ash slides in the intermediate cavity 116 (see FIG. 10) between the rotary grate bottom 17 and the shaft bottom surface which slopes downwardly in funnel-like manner into the central aperture 115. It is advantageous to so tune the withdrawal rate of the ash that, if possible, no non-converted carbon residues of the gasifiable material feed are retained in the discharged ash. FIGS. 10, 11 show a special design of the bottom 117 of the rotary grate for that purpose.

In FIGS. 10, 11 the rotary grate bottom 117 above the funnel-shaped shaft bottom 114 is illustrated on a larger scale as a detail of the gasification reactor 5 according to FIG. 7. To the underside of the rotary grate bottom 117 a baffle formation is fitted, which in the working example is composed of an annular external and an annular internal solids guide means 118, 119, which cause the ash sliding over the shaft bottom to be dammed up, permitting only finely particulate ash material to exit in the arrow direction 120 into the central aperture 115 and at the same time controlling the rate of discharge of the ash. In this context the maximum particle size of the ash is determined by a gap 121 left between the last solids guide means 119 viewed in the direction of conveyance of the ash and the sliding surface for the ash on the funnel-shaped shaft bottom 114. In order that the discharge of finely particulate solids residues cannot be blocked by coarser slag, forwarding formations 122 are provided on the rotary grate bottom 117 in the region of the baffle device, which turn over the ash layer in the interspace 116 in the rotary direction 75 when the rotary grate 73 turns about its axis 72 and, if necessary, causes slag lumps to be comminuted. In the working example the forwarding formations 122 are provided between the two solids guide formations 118, 119. The forwarding formations are radially directed in relation to the axis 72 (see FIG. 11) and support the ash discharge through the gap 121. Depending on the particular application, the forwarding formations may also be of scoop-like design, thereby to lift and rearrange part of the ash during movement of the rotary grate. In the working example the outermost solids guide means 118 and the forwarding formations 122 are welded to the rotary grate bottom 117. The innermost solids guide means 119 is so fixed to the forwarding formations 122 at a vertical distance from the rotary grate bottom that below the rotary grate bottom 117 a flow passage 123 in the form of an annular gap or series of apertures is retained. Primarily the fuel gas is discharged through the annular gap after having flown through the embers bed 98 and the ash dammed up in the interspace 116, towards the fuel gas duct 9. The fuel gas flow in the interspace 116 through the flow passage 123 is schematically designated by flow arrows 130, designating a meandering flow path.

In determining the size of the flow passage 123 and the gap 121 for ash discharge, the object is to achieve a separation of the solids residues from the fuel gas. The fuel gas is deflected in the interspace 116 towards the flow passage 123. This is attained in that the lower edge of the outermost solids guide formation 118 in the intermediate space 116 is lower than the upper edge of the innermost solids guide formation 119, which limits the through-flow passage 123. The dimensions and arrangement of the solids guide formations are so selected that the through-flow passage for the exiting fuel gas is kept open, more particularly, is kept free of solids residues which may become dammed up in the discharge region. The flow resistance for the fuel gas when flowing through the solids bed in the intermediate space 116 should be kept as low as possible. The solids guide formations retain the material and reduce the flow resistance for the fuel gas.

For a central alignment and local stabilisation of the rotary grate 73 in the interior 71 of the gasification reactor 5, a guide 125 fixed to the rotary grate extends from the bottom 117 of the rotary grate for holding the rotary grate in its axial position and to prevent malalignment thereof which might result in density variations within the particulate solids bed, thereby causing pressure being applied to the rotary grate. In the working example the guide 125 consists of steel sheets at right angles to one another which are welded to the rotary grate bottom 117 (see in cross-section FIG. 11).

The rotary grate 73 is rendered level-adjustable parallel to the axis 72 in a direction of displacement 126. This makes it possible for discharging the ash to modify the width of the gap 121 between the baffle formation, in the working example between the inner solids guide formation 119 and the funnel surface of the shaft bottom 114. The width of the gap is adjustable to the maximum permissible particle size for the exiting ash particles. Beyond this, the rotary grate 73 can be pulled upwardly sufficiently for purposes of cleaning the ash discharge formations. The sliding incline of the funnel-shaped shaft bottom 114 also plays a decisive role for the ashes discharge. Accordingly, the segment base 77 illustrated in FIG. 10 may be suitably exchanged against a segment base comprising a shaft bottom having a greater or lesser inclination.

Figure 12:
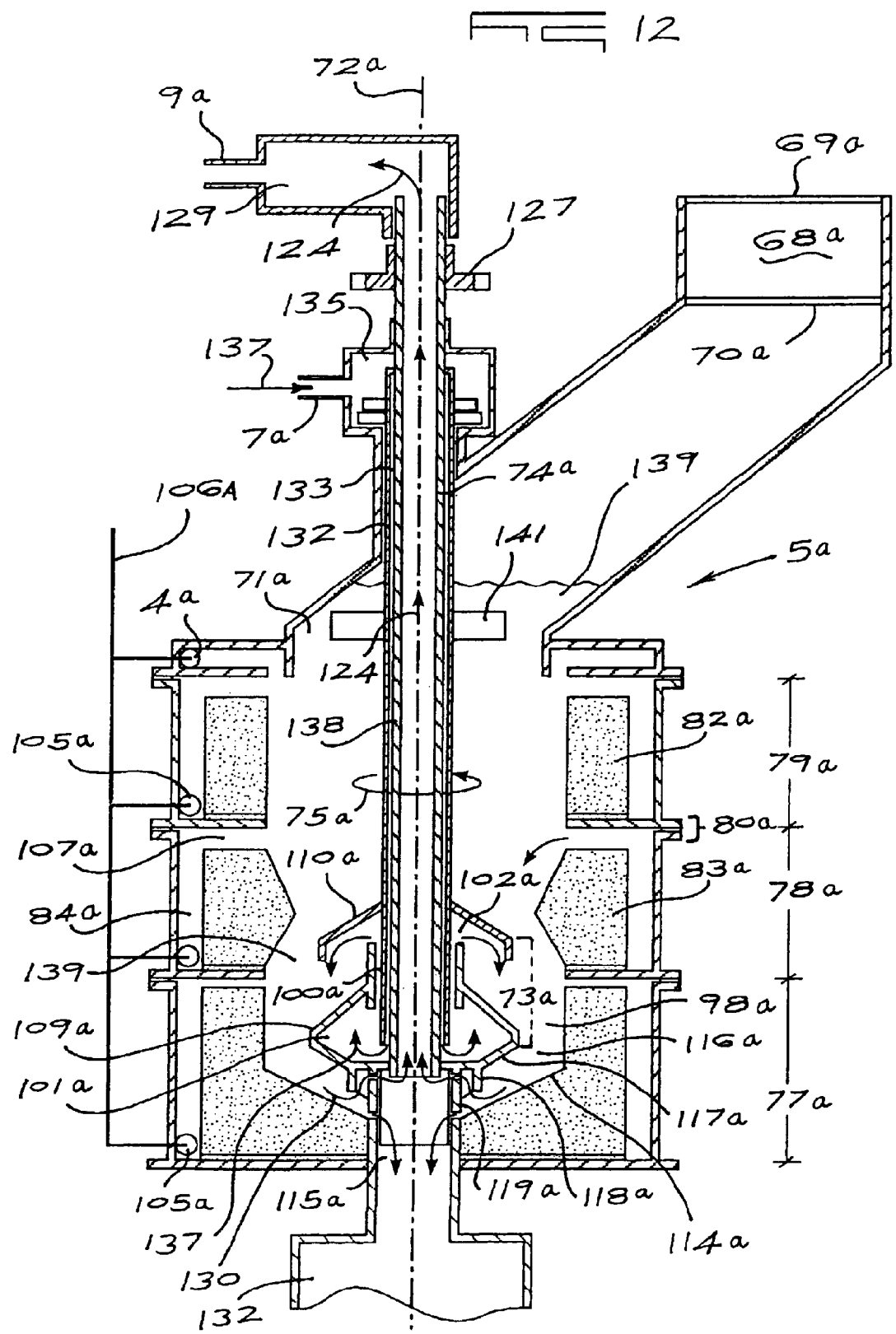
Figure 13:
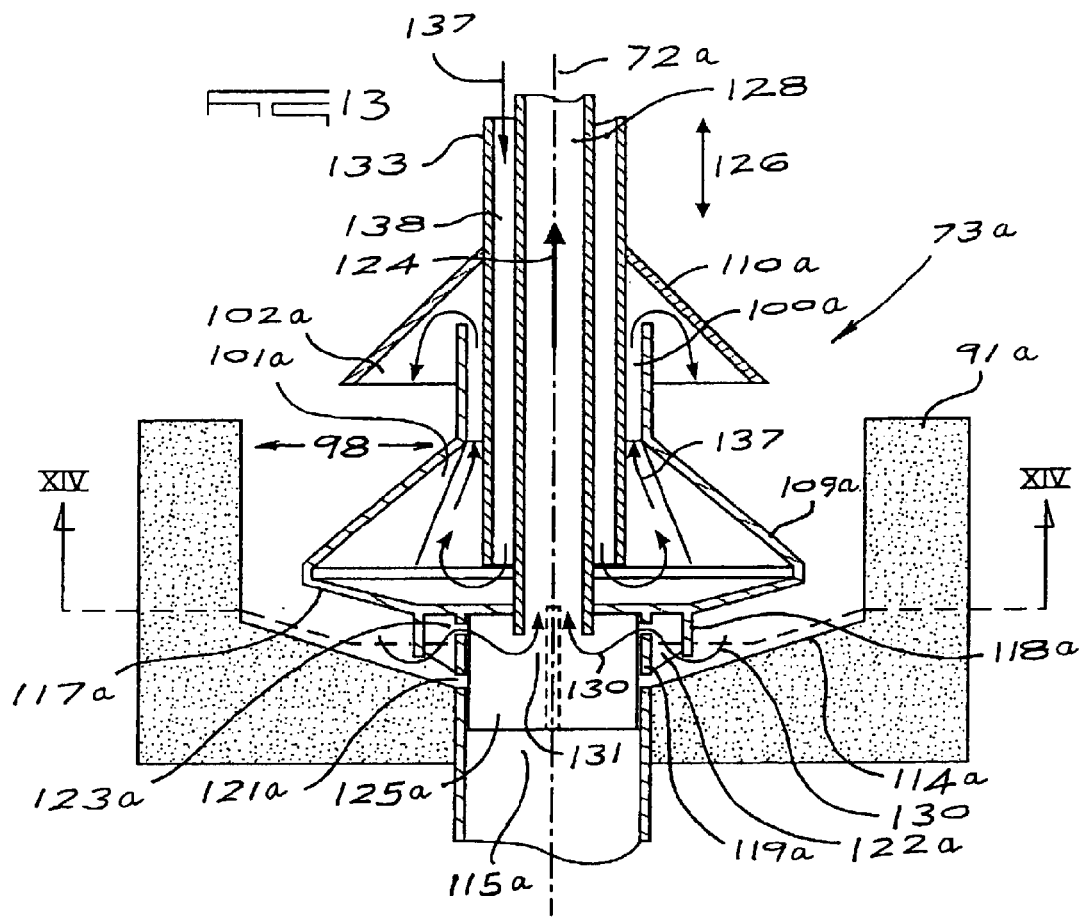
Figure 14:
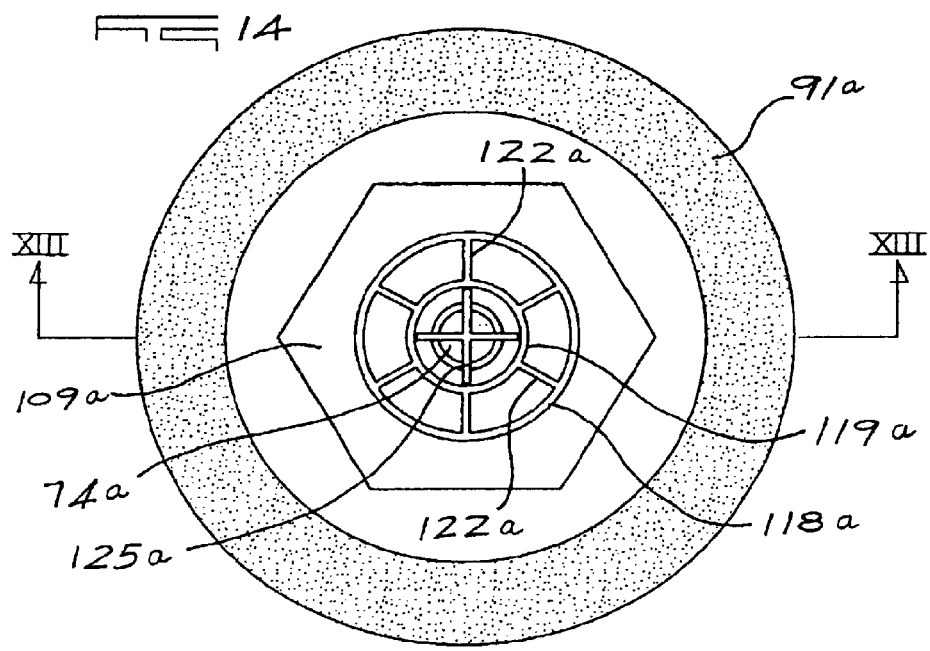

A modification of the gasification reactor according to FIGS. 7, 8, 9, 10, 11 is shown in FIGS. 12, 13, 14. In FIGS. 12, 13, 14 all construction elements of the gasification reactor having analogous functions as described above with reference to the working examples of FIGS. 10 to 11 are denoted by the same reference numbers, however, with the addition of the letter "a".

In the gasification reactor 5a according to FIG. 12 the generated fuel gas is withdrawn centrally upwardly from the shaft reactor. For this purpose the drive shaft 74a is connected to a drive element 127, provided in the overhead region of the gasification reactor above the particulate solids bed, and turns the drive shaft 74a and the rotary grate 73, including the grate elements 109a and 110a in the direction of rotation 75a. The drive shaft 74a is of hollow design in the same manner as in gasification reactor 5 according to FIG. 7 and functions as a gas withdrawal pipe 128 discharging at its upper open end into a fuel gas chamber 129, to which the fuel gas duct 9a is connected. Accordingly, the generated fuel gas flows in the direction of the flow arrows 130 from the lower region of the gasification reactor, initially through the intermediate space 116a between the solids guide formations 118a, 119a underneath the rotary grate bottom 117a and the through-flow passages 123a towards the fuel gas inlet 131 of the gas withdrawal pipe 128 and hence in an upward direction to the fuel gas chamber 129 and to the connection to the fuel gas duct 9a. The solids residues not gasified in the gasification reactor 5a on the other hand drop through a central aperture 115a in the chamotte block 91a, serving to form the shaft reactor bottom 114a, into an ash chamber 132 in the same way as in the embodiment according to FIG. 7.

This way of conducting the generated fuel gas through the central gas withdrawal pipe 128 in an upward direction out from the gasification reactor offers the advantage that only very fine solids particles will become entrained in the fuel gas being withdrawn, which in the event of very high requirements as to freedom from dust of the fuel gas to be withdrawn may be retained in additional filter means provided in the fuel gas duct 9a. Of particular importance in relation to the withdrawal of the fuel gases within the drive shaft 74a is, however, particularly the possibility of heat exchange between the hot fuel gas being discharged from the gasification reactor and the cold gasification medium being introduced into the gasification reactor. For this purpose the drive shaft 74a is surrounded by a gas pipe 133, the upper pipe end 134 of which is welded in a gas-tight manner, in this working example, to the drive shaft 74a below the drive element 127 and comprises inlet apertures 136 for the gasification medium, which communicate with a gasification medium chamber 135. The drive shaft 74a and the gas pipe 133 enter or pass through the gasification medium chamber 135 in a gas-tight manner. The gasification medium feed line 7a feeds into the gasification medium chamber 135. The gasification medium flows through the inlet apertures 136 in the gas pipe 133 in the direction of flow 137 in the intermediate space 138 between the inside of the gas pipe 133 and the outside of the drive shaft 74a to the gas chambers 101a and 102a, which are interconnected by the gas passage 100a. On entering the interior 71a of the gasification reactor 5a, the gasification medium which in the gasification medium chamber 135 will generally still be at room temperature, takes up the heat of the hot fuel gas being discharged from the gasification reactor through the gas withdrawal pipe 128 in the drive shaft 74a and being thereby warmed up, flows into the embers bed 98a in the lower region of the particulate solids bed in the interior 71a of the gasification reactor. In order to improve this heat transfer the wall of the pipe (drive shaft) 74a may be equipped with heat transfer ribs or webs (not shown). In FIG. 12 the particulate solids bed is diagrammatically illustrated—in particular, by markings representing the particulate solids bed surface in the shaft interior—and is denoted by reference number 139.

As for the remainder, the gasification reactor Sa according to FIG. 12 is of analogous construction to the gasification reactor according to FIGS. 7, 8, 9. The material to be gasified is introduced into the interior 71a by way of a material lock chamber 68a comprising appropriate lock gates, an outer and an inner lock gate 69a, 70a. The cylindrical interior 71a is outlined by segments 78a, 79a including connecting elements 80a, the segments, depending on their desired effect on the particulate solids bed being designed to homogenise the former and are, if desired or required, mutually interchangeable. The segments include pipe ducts 105a for feeding gasification medium. The gasification media are introduced by way of the pipe ducts into the intermediate cavities 84a in the outer wall region of the gasification reactor 5a, they then flow by way of the intermediate cavities 107a between the chamotte blocks 82a, 83a of the segments into the cylindrical interior 71a filled with heaped particulate solids.

In the embodiment according to FIG. 12 the grate elements 109a and 110a of the rotary grate 73a are only slightly modified in relation to the grate elements 109 and 110 according to FIGS. 7, 8, 9, in which context the grate element 110a once again acts as a flame breakthrough blocking means in the particulate solids bed. The grate elements 109a and 110a are illustrated on a larger scale in FIGS. 13, 14. Although they comprise the same pyramidal configuration as shown for the grate elements 109 and 110 in FIGS. 8, 9, the bottoms of the grate elements 109a and 110a are, however, of different design. Thus, in the case of the grate element 110a for the gas chamber 102a a bottom element (see for comparison bottom 113 in the embodiment according to FIG. 7) is omitted; the gasification medium accordingly flows freely from the gas chamber 102a into the particulate solids bed 139 and into the embers bed 98a which is formed in the heaped solids in that position. The rotary grate bottom 117a of the grate element 109a is closed as in the case of the grate element 109, however, the drive shaft 74a passes through the rotary grate bottom and its open end for the fuel gas inlet 131 terminates below the rotary grate bottom 117a. The rotary grate bottom slopes downwardly towards the central aperture 115a in the shaft bottom 114a in a pyramidal configuration.

The drive shaft 74a according to the embodiment of FIG. 12 can likewise be displaced in axial direction 140 (see FIG. 14) such that the width of the gap 121a for the passage of ash into the ash chamber 132 can be adjusted to a predetermined particle size of the ash, depending on requirements. Once again a guide formation 125a is fixed to the rotary grate bottom 117a which stabilises the position of the rotary grate in the particulate solids bed 139 inside the shaft reactor. The guide formation is once again made of steel sheet baffles at right angles to one another.

For conveying the added gasifiable material, a material distributor is fitted to the circumference of the gas pipe 132 in the inlet region of the shaft reactor, which, when the drive shaft 74a rotates, moves about the material by means of agitating baffles 141, extending into the particulate solids bed.

Any one of the gas generators described with reference to FIGS. 7 to 14 can also be used independently to perform the processes according to the invention, i.e. without receiving dry distillation volatiles produced in a separate dry distillation reactor apparatus as described with reference to FIG. 4. In that case, the upper region represented by sections 78, 79 will accommodate the dry distillation zone. If the process is to be performed in accordance with FIG. 3, i.e. with the dry distillation zone being operated in co-current flow mode, it is preferred to do so using a solids charge having a modest moisture content, preferably of not more than about 15% w/w and composed of solids having favourable bed forming characteristics and which carbonise relatively readily without producing excessive amounts of condensable volatiles. In that case, the embers bed maintained near the solids discharge region in segment 77 alone and the features thereof relating to the constrictive pathway through which the embers bed and the solids residues must pass together with the fuel gas stream are solely responsible for achieving high quality fuel gas characteristics. In that case, it may be particularly preferred to also increase the height of the commencement of the constrictive pathway between the outermost periphery of the lowermost grate element 109 and the inner periphery of the cylindrical upright section of the chamotte block 101. This may be done by providing a cylindrical or prismatic vertical wall portion of appreciable height (see FIG. 10) between the inverted conical or pyramidal bottom portion of the grate element 109 and the conical or pyramidal upper portion of that grate element. The greater the height of that wall portion, the greater will be the increase in length of the constrictive pathway and the greater will be the effect, provided there is still sufficient exothermic reaction being maintained there in order to maintain satisfactory cracking conditions. If necessary, additional oxygen must be injected to react exothermally with any carbonaceous matter still present in the bed.

The above lengthening of the constrictive pathway can be applied regardless of whether the apparatus of FIGS. 7 to 14 is operated in the manner of FIG. 1, 2 or 3. The manner of FIG. 2 is preferred if the apparatus of FIGS. 7 to 14 is employed alone. In that event, it may be preferable to increase the height of the dry distillation zone, e.g. by adding a further modular segments The dry distillation volatiles rise upwards through the bed in counter-current to the solids of the bed by suction being applied to pipe 4 in the head section 96. The volatiles will thereafter be returned into the gasification zone, through one of the feed pipes 105 below the level where oxygen-containing gas is introduced for maintaining partial combustion in the dry distillation zone.

It has been found that, performing the present invention, in particular the gasification stage, in a shaft reactor of circular cross-section, which is ideally done, using rotary grate elements as herein disclosed, offers considerable advantages as compared with shaft reactors of square or rectangular cross-section. Using the internals herein disclosed, material conveyance and bed uniformity are enhanced. Because of the higher volume to wall area ratio, thermal efficiency is improved and less material is needed for the construction of the apparatus.

Particularly in those cases, where a significant degree of pyrolysis, i.e. dry distillation takes place in the upper region of this reactor vessel which accommodates the gasification zone, it is preferred to extend the height of the reactor vessel sufficiently in order to accommodate and provide at least one further, i.e. rotary third grate or discharge element coaxial with the aforesaid preferably two grate elements extending into the dry distillation region of that reactor vessel. The purpose of this further grate or discharge element is to control the rate of travel and the evenness of the particulate solids bed in the region where dry distillation takes place, before entering the gasification zone. This further grate element may likewise serve as a means for feeding oxygen-containing gas into the region where dry distillation takes place, preferably with feed control means separate from those controlling the supply of gasification medium to the gasification zone.

Referring now to FIGS. 15 to 18, integers equivalent in function to integers shown in FIGS. 7 to 14 will be denoted by the same reference numbers, except for the addition of the suffix "b". They will not be described again except in order to show differences from their counterparts in the remaining figures. These differences are primarily the following. The cylindrical portion 71b of the reactor has been upwardly extended substantially by a portion 271, thereby to extend the height of the downwardly moving solids bed feeding the pyrolysis or dry distillation region of reactor 5b. The capacity of the solids feed region leading into this portion 271 has been also increased and at the same time constructionally simplified and improved by a funnel-shaped hopper formation 272 supplied by the material lock means 68b, 69b, 70b which are automatically actuated in response to signals generated by bed level sensing means (not shown) inside the hopper formation 272. As in previously described embodiments, rotary agitating and bed reforming means 141b driven by the drive shaft 74b serves to form an even bed entering the cylindrical reactor shaft 271.

Optionally (not shown) the portion 271 may be insulated thermally.

The drive shaft 74b and the feed pipe 133b for oxygen-containing gas are surrounded concentrically in their portion extending from near the closed top 273 of the hopper portion down to near the bottom region of cylindrical portion 271 by a further feed pipe 274, so as to leave a gap 275 between feed pipe 133b and feed pipe 274. Also near the top 273 of the hopper formation 272 a feed nipple 276 for oxygen-containing gas, e.g. air or oxygen-enriched air enters the hopper portion in the space above the level 277 of the solids bed. Following the path of least resistance, this oxygen-containing gas travels downwards, preferably through the gap 275 to the open bottom end of pipe 274, where it enters the solids bed. This is facilitated further by a fire grate and rotary bed agitating member 278, which could be a further grate or discharge element similar to elements 110, 110a, 110b as described further above. However, in the present modification this rotary agitating member 278 is not of conical or pyramidal configuration but is composed by a plurality of short tubular members 279 fitted, more particularly welded onto the outer periphery of the bottom end of pipe 274. In the present embodiment four groups of three tubular members 279, each orientated parallel to the axis 72b of the drive shaft 74b are welded to the outer periphery of pipe 274 so that a gap 280 is left between successive groups of tubular members 279. The effect of these groups of tubular members is twofold. Firstly, rotation of the shaft produces an agitating effect and opens up a cavity in the bed near the bottom end of pipe 274 into which oxygen-containing gas may flow. The tubular nature of the tubular members 279 moreover has the effect of providing passages for the oxygen-containing gas into the region of the bed immediately above the member 278. The combined effect is to facilitate the partial combustion in the dry distillation region of reactor 5b.

A further difference of the embodiment of FIG. 15 resides in the design of the ash chamber 132b and the means for separating the fuel gas, where it is being withdrawn from the ash and/or cinders entering the ash chamber 132b. It will be seen that in FIG. 15 the fuel gas inlet 131b of shaft 74b extends some distance below the rotary grate bottom 117b, well below at the ash outlet gap 121b, leaving an annular gap 281 in the central aperture 115b between the solids guide formation 119b and drive shaft 74b. The guide 125b differs from guide 125 in earlier embodiments by the provision of a sleeve 282, surrounding the bottom end of shaft 74b, and held in place by braces 283. The sleeve 283 is extended downwardly by an outwardly flaring conical baffle 284.

The ash chamber 132b itself comprises an upper cylindrical portion 285 terminating approximately at the level of the lower edge of the baffle 284 and from there tapering conically at 286 toward a cylindrical ash collecting box 287 having an ash withdrawal outlet 288 and an inlet 289 for oxygen-containing gas, preferably having an oxygen content higher than air, e.g. a technical grade oxygen of 80% or higher, depending on the residual carbon content in the solids residue, the object being to produce ash with a minimum of carbon.

Referring specifically to FIGS. 17 and 18, it will be seen that the pyramidal top 290 of the lowermost grate member 109b is followed in downward direction by a prominent cylindrical peripheral wall portion 291 (as is also the case in FIG. 15). In contrast to FIG. 15, the solids guide member 118b, here denoted as 292 is moved closer to the reactor wall 293 and forms a direct continuation of wall portion 291 of grate member 109b, extending downwardly from the bottom 117b of the latter. Accordingly, there is formed a prominent constricted annular passage 294 through which the embers bed 8b must travel. This passage is followed by the inwardly downwardly sloping funnel-shaped continuation of the constricted pathway defined between the funnel-shaped bottom 114b of the reactor shaft, the bottom edge 295 of solids guide formation 292 and the adjustable gap 121b defined by the bottom edge of solids guide formation 119b.

In the use of reactor 5b the embers bed 98b, including gas passing therethrough in co-current, moves in downward direction towards the central aperture 115b. In doing so, the embers bed passes through the annular constricted passage 294, down the slope of bottom 114b and finally through gap 121b into central aperture 115b. There the solids residues drop down onto the baffle 284 and the funnel-shaped wall portion 286 into the ash box 287. In the ash box, depending on the residual carbon content, oxygen and/or air is admitted through an inlet represented by a nozzle 289 in substoichiometrical amounts to convert by partial post combustion the residual carbon into heat, carbon monoxide and $CO_2$ which is withdrawn together with the fuel gas product through the inverted funnel-shaped cavity formed by baffle 284 and through drive shaft 74b.

The fuel gas, having passed in intimate contact through the embers bed, leaves the solids bed along its meandering pathway 130b entering through apertures 123b also into the central aperture 115b into the top of ash chamber 132b and from there—arrow 290—into the inverted funnel-shaped cavity formed by baffle 284 and up into fuel gas inlet 131b of drive shaft 74b. This gas pathway serves to cause disentrainment of solids fines from the fuel gas.

Optionally, this disentrainment may be enhanced by internals inducing a cyclonic spin to the gas to promote settlement of dust against the inside of baffle 284.

Finally, FIG. 15 shows gastight annular sheet metal screens 291 separating the annular gas cavities 84bbetween the refractory blocks 82b, 83b, 91b and the exterior reactor walls 92b. The screens 291 are so dimensioned that an expansion gap 292 is left between the ceramic blocks and the screens. The screens are welded gastight onto the support brackets 87b.

Figure 19:
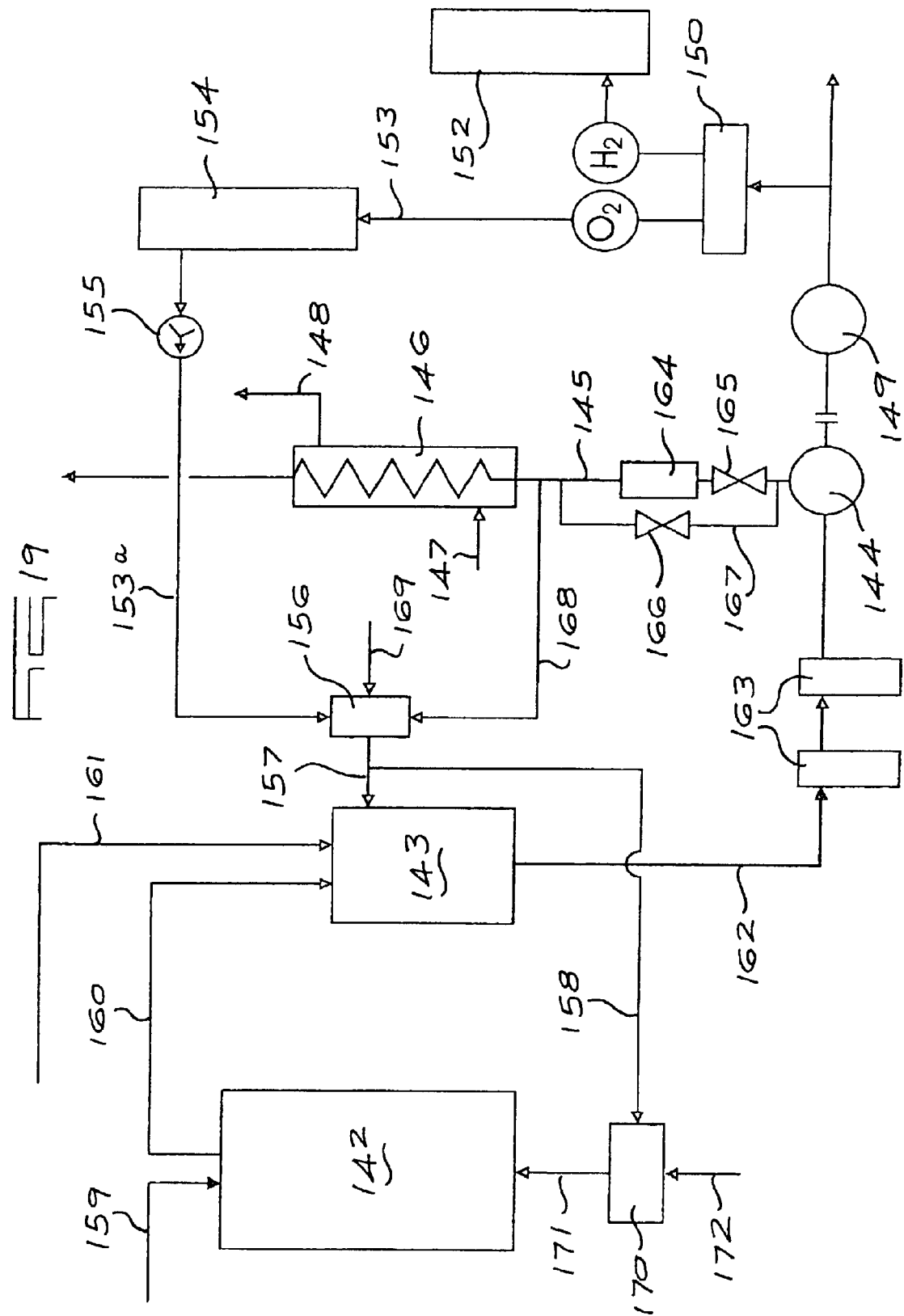

A particularly important use of the gas processor in a plant for the production of hydrogen is shown in FIG. 19. To begin with, the plant comprises the above described dry distillation and gasification reactors, in the working example a dry distillation reactor 142 and a gasification reactor 143 as well as a gas motor 144, downstream of the gasification reactor, operated with the fuel gas produced in the gasification reactor. For heat recovery a heat exchanger 146, through which flows motor exhaust gas, is provided in the motor exhaust passage 145 of the gas motor 144; a heat carrier, for example, water, passes through the heat exchanger and takes up the thermal energy still contained in the motor exhaust gas. Feed and withdrawal ducts 147, 148 for the heat carrier are indicated in FIG. 19 by corresponding flow arrows.

The gas motor 144 serves to drive a generator 149 for the generation of electrical energy. An electrolysis cell 150 is connected to the generator by means of which hydrogen and oxygen are produced electrolytically. Both gases are conveyed to separate gas storage means, the produced hydrogen by way of a hydrogen duct 151 to a hydrogen storage means 152, the oxygen by way of an oxygen duct 153 to an oxygen storage means 154. Whereas the hydrogen and any excess energy generated by the generator is available for withdrawal and general use, at least part of the produced oxygen is returned to the plant The oxygen is pumped by a feed pump 155 by way of a feed duct 153a into a mixing chamber 156 and is there mixed with part of the motor exhaust gas and with air and flows in the form of this gas mixture as gasification medium by way of a gasification medium line 157 to the gasification reactor 143 and also by way of a gasification medium branch duct 158 to the dry distillation reactor 142.

In the working example biomass in heterogeneous form, e.g. "yellow waste bag" or waste rubber, such as motor vehicle tyres or renewable raw materials such as straw or specially planted fast-growing energy crops, annual or perennial, are gasified in the dry distillation reactor 142. The heterogeneous biomass is fed into the dry distillation reactor 142 by way of a feed duct 159 and is converted into dry distillation volatiles by conversion with gasification media. The dry distillation volatiles flow by way of a dry distillation gas duct 160 into the gasification reactor 143. In the gasification reactor the dry distillation volatiles are converted into fuel gas. For this purpose it is passed through a particulate solids bed, which in the working example is composed of biomass in a homogeneous form. For example shredded wood, charcoal or suitable wood pellets may be used as a homogeneous biomass and be introduced into the gasification reactor 143 by way of a material feed means 161. In the outlet region of the gasification reactor the biomass—as already described with reference to the embodiment of FIG. 7—forms an embers bed through which the dry distillation volatiles flow. In doing so, the high molecular hydrocarbon components and other tar components in the dry distillation gas are cracked. The fuel gas being discharged from the gasification reactor is passed in a fuel gas line 162 to the gas motor 144, if desired or required, after having been passed through a gas cleaning means 163 installed in the fuel gas line 162. In order to clean the motor exhaust gases discharged by the gas motor 144 and passed to the heat exchanger 146, a catalyst 164 may be employed. In the working example the amount of exhaust gas passing through the catalyst 164 is regulated by means of valves 165, 166. The valve 166 is provided in a by-pass line 167 passing parallel to the motor exhaust gas duct 145.

The motor exhaust gas passed to the mixing chamber 156 is withdrawn by way of a gas duct 168 connected to the motor exhaust gas duct 145. In the working example the gas feed line 168 is connected to the motor exhaust gas duct 145, even before the exhaust gas enters the heat exchanger 146. Accordingly, the exhaust gas flowing into the mixing chamber 156 still has its exhaust gas temperature as determined by the motor. In order to set up the desired composition and concentration of the gasification medium, an air feed 169 is also connected to the mixing chamber 156.

A mixing chamber 170 for the gasification medium to be introduced is likewise provided upstream of the dry distillation reactor 142 before the gasification medium enters the reactor through a gasification medium feed line 171. In the working example the gasification medium branch line 158 connected to the mixing chamber 156 as well as an air feed duct 172 enter into the mixing chamber 170.

In the plant illustrated in FIG. 19 there is thus recovered from biomass a valuable energy carrier, i.e. hydrogen, in an advantageous manner besides electrical energy and a recovery of thermal energy from motor waste gases. The plant is self-sufficient in respect of the electrical energy required for its operation and may accordingly be set up preferably as an energy-generating plant at remote localities.

From the aforegoing it will be apparent that the invention is, on the one hand, based throughout on the single, uniform inventive concept of consistently generating a high quality fuel gas, substantially free of condensable high molecular weight contaminants by guiding the gases being generated through the particulate solids bed(s) maintained in the generator as a well-configured high temperature embers bed so that complete cracking of these contaminants can be attained far more completely by simpler means than according to the prior art. On the other hand, the invention includes numerous facets which interact both cumulatively as well as symbiotically with the aforegoing to achieve this objective under the most varied circumstances as may arise both in high-tech as well as least developed circumstances. The invention offers the potential of solving environmental problems under the most diverse conditions.

The flexibility of the inventive concept allows for numerous modifications within the scope of the invention. Thus, the oxygen generated in accordance with FIG. 19 can also be made available as a primary by-product in remote areas, e.g. for medical as well as technical purposes (e.g. welding). For use in the fuel gas generation process, the oxygen may also (at least in part) be used in substantially pure form, for example, for injection into any one of the particulate solids beds whenever a local increase in temperature is needed, either continuously or temporarily and intermittently. If it is desired to enrich the oxygen content of oxygen-bearing gas, optionally even to the extent of using a technically pure grade of oxygen (e.g. 80% pure or higher) in any part of the process, it is also feasible to employ other sources of such oxygen, not necessarily produced by air distillation, but optionally by alternative processes such as molecular sieve (zeolite) technologies, which may be more appropriate in a remote locality.

In the installation according to FIG. 19 it may furthermore be advantageous to provide for buffer storage facilities, such as gasometers and compressed gas tanks for the temporary storage of fuel gas and/or hydrogen produced to provide for fluctuating needs.

As regards the gasses produced in various stages of the process according to the invention, it is not essential that the entirety of these gases should be processed identically. It is, for example, possible for part of the dry distillation gases and/or gasification gases to be withdrawn at a stage of the process where the purity is less than required for internal combustion engines in order for such somewhat lower grade fuel gas to be used in gas burners, e.g. for cooking and heating or for steam generation. A great need exists for cooking gas in remote rural underdeveloped areas to counteract the health hazards of smoke exposure in traditional cooking using open wood fires.

It is also possible to withdraw at least part of the dry distillation volatiles at an early stage of the process for the actual recovery of condensable volatiles as useful products, e.g. for the recovery of wood tar and creosote for the impregnation of timber, for which a great need exists in rural underdeveloped areas, the recovery of methanol as a fuel and the recovery of other by-products.

The process also permits the withdrawal, e.g. in a side stream of the process, of charcoal as an additional fuel product, useful as a "smokeless" fuel.

As an alternative to using the fuel gas directly as a fuel, it is also possible in manners known per se to perform the process so as to maximise the yield of hydrogen (water gas reaction), in order to produce hydrogen, e.g. for use in fuel cells.

Likewise, in a manner known per se it is possible to operate the process and apparatus according to the invention so as to produce a product gas having the composition of synthesis gas if that is needed.

Finally, the process, as illustrated in FIG. 19 offers numerous additional possibilities for recovering useful heat, e.g. in the form of hot water for which a great need exists in sophisticated as well as least developed communities. Besides the recovery of heat from the exhaust gases of gas fueled motors, heat may also be recovered from cooling the engines as such. Any heat not needed for other purposes can be used to preheat the gasification media in order to improve the thermal efficiency of the process as a whole. In order to achieve this, it is further possible to pass the gasification media in heat exchange with the ashes of the dry distillation and gasification zones.

The claims which follow are to be considered an integral part of the present disclosure. Reference numbers (directed to the drawings) shown in the claims serve to facilitate the correlation of integers of the claims with illustrated features of the preferred embodiment(s), but are not intended to restrict in any way the language of the claims to what is shown in the drawings, unless the contrary is clearly apparent from the context. The term "comprises" or "comprising" as used herein and in the claims, has its customary non-restrictive meaning which required for its operation and may accordingly be set up preferably as an energy-generating plant at remote localities.

From the aforegoing it will be apparent that the invention is, on the one hand, based throughout on the single, uniform inventive concept of consistently generating a high quality fuel gas, substantially free of condensable high molecular weight contaminants by guiding the gases being generated through the particulate solids bed(s) maintained in the generator as a well-configured high temperature embers bed so that complete cracking of these contaminants can be attained far more completely by simpler means than according to the prior art. On the other hand, the invention includes numerous facets which interact both cumulatively as well as symbiotically with the aforegoing to achieve this objective under the most varied circumstances as may arise both in high-tech as well as least developed circumstances. The invention offers the potential of solving environmental problems under the most diverse conditions.

The flexibility of the inventive concept allows for numerous modifications within the scope of the invention. Thus, the oxygen generated in accordance with FIG. 19 can also be made available as a primary by-product in remote areas, e.g. for medical as well as technical purposes (e.g. welding). For use in the fuel gas generation process, the oxygen may also (at least in part) be used in substantially pure form, for example, for injection into any one of the particulate solids beds whenever a local increase in temperature is needed, either continuously or temporarily and intermittently. If it is desired to enrich the oxygen content of oxygen-bearing gas, optionally even to the extent of using a technically pure grade of oxygen (e.g. 80% pure or higher) in any part of the process, it is also feasible to employ other sources of such oxygen, not necessarily produced by air distillation, but optionally by alternative processes such as molecular sieve (zeolite) technologies, which may be more appropriate in a remote locality.

In the installation according to FIG. 19 it may furthermore be advantageous to provide for buffer storage facilities, such as gasometers and compressed gas tanks for the temporary storage of fuel gas and/or hydrogen produced to provide for fluctuating needs.

As regards the gasses produced in various stages of the process according to the invention, it is not essential that the entirety of these gases should be processed identically. It is, for example, possible for part of the dry distillation gases and/or gasification gases to be withdrawn at a stage of the process where the purity is less than required for internal combustion engines in order for such somewhat lower grade fuel gas to be used in gas burners, e.g. for cooking and heating or for steam generation. A great need exists for cooking gas in remote rural underdeveloped areas to counteract the health hazards of smoke exposure in traditional cooking using open wood fires.

It is also possible to withdraw at least part of the dry distillation volatiles at an early stage of the process for the actual recovery of condensable volatiles as useful products, e.g. for the recovery of wood tar and creosote for the impregnation of timber, for which a great need exists in rural underdeveloped areas, the recovery of methanol as a fuel and the recovery of other by-products.

The process also permits the withdrawal, e.g. in a side stream of the process, of charcoal as an additional final product, useful as a "smokeless" fuel.

As an alternative to using the fuel gas directly as a fuel, it is also possible in manners known per se to perform the process so as to maximise the yield of hydrogen (water gas reaction), in order to produce hydrogen, e.g. for use in fuel cells.

Likewise, in a manner known per se it is possible to operate the process and apparatus according to the invention so as to produce a product gas having the composition of synthesis gas if that is needed.

Finally, the process. as illustrated in FIG. 19 offers numerous additional possibilities for recovering useful heat, e.g. in the form of hot water for which a great need exists in sophisticated as well as least developed communities. Besides the recovery of beat from the exhaust gases of gas fueled motors, heat may also be recovered from cooling the engines as such. Any heat not needed for other purposes can be used to preheat the gasification media in order to improve the thermal efficiency of the process as a whole. In order to achieve this, it is further possible to pass the gasification media in heat exchange with the ashes of the dry distillation and gasification zones.

The claims which follow are to be considered an integral part of the present disclosure reference numbers (directed to the drawings) shown in the claims serve to facilitate the correlation of integers of the claims with illustrated features of the preferred embodiment(s), but are not intended to restrict in any way the language of the claims to what is shown in the drawings, unless the contrary is clearly apparent from the context the term "comprises" or "comprising" as used herein and in the claims, has its customary non-restrictive meaning which denotes that in addition to any items to which the term relates, there may be included additional items not specifically mentioned.

What is claimed is:

1. A process for the generation of a fuel gas by dry distillation of carbonaceous solids in a dry distillation zone into which the carbonaceous solids are fed via a solids supply and in which the solids are heated, where applicable dried and are dry-distilled with the liberation of dry distillation volatiles and, by further conversion of those volatiles in a gasification zone in the presence of carbonaceous solids passing through the gasification zone at least in part under gravity in the form of a bed of particulate solids, to which gasification media are fed in substoichiometric quantities, the dry distillation volatiles withdrawn from the dry distillation zone entering the gasification zone and flowing through the bed of particulate solids being there maintained in co-current with the direction of travel of the latter, an embers bed being formed by the bed of particulate solids in the terminal portion of the gasification zone in the region of a fire grate element acting further as a solids discharge element for the residual solids after completion of the gasification, through which embers bed the gas formed in the bed of particulate solids passes, whereby condensable volatiles components contained in the gas are cracked, and wherein the fuel gas so generated is withdrawn from the lower region of the bed of particulate solids of the gasification zone, wherein gas containing oxygen is introduced into the dry distillation zone in substoichiometric amount for generating heat by partial combustion of the solids to be dry-distilled passing through the dry distillation zone in the form of a bed of particulate solids under the action of gravity before the generated fuel gas product is separated from ashes and any cinders and is withdrawn and forwarded for further use, said process further comprising additional measures for further decreasing the content of condensable dry distillation volatiles in the fuel gas product by increasing the intimate contact of the gases and vapours with the solids beds through which they pass, selected from either or both of the following:

A) that the embers bed of the gasification zone is conducted from the higher lying regions of said zone under gravity towards and through a constricted lower peripheral passage region of the gasification zone defined between the outer periphery of the fire grate element and the inner periphery of exterior walls of a reactor in which the process is performed, and in co-current therewith the dry distillation volatiles and gasification gases and any gaseous cracking products are passed in intimate contact with and through the embers bed and from there travels down a funnel-shaped inwardly sloping constricting pathway below the fire grate element leading into and ending with the ash withdrawal region, where the separation occurs between the ashes and any cinders and the generated fuel gas product;

B) that in at least one dry distillation zone in the form of a bed of particulate solids under the action of gravity the gas present in that zone passes through the solids in counter-current to the direction of travel of the solids to be dry distilled, the solids thereby being dry distilled and the dry distillation volatiles thereby formed in the dry distillation zone being withdrawn from the dry distillation zone near the solids supply region and that at least part of the dry distillation volatiles formed in the dry distillation zone withdrawn from near the solids supply region feeding the dry distillation zone with carbonaceous solids are from there forwarded into the gasification zone, where they, together with gasification gases and any gaseous cracking products, pass in co-current with and in intimate contact with and through the embers bed of the gasification zone and are subjected to cracking of condensable volatiles, before being separated from ashes and any cinders and being withdrawn as a fuel gas product, subject further to the condition that, at least when feature A) is absent and where the at least one dry distillation zone, wherein the bed of particulate solids and the gas present therein pass in counter-current to one another, is maintained in a first vessel, distinct and separate from a second vessel, wherein the bed of carbonaceous solids and the gases and vapours pass in co-current with one another, (i) the bed of particulate solids in the first vessel is there combusted and gasified substantially entirely to solids residues consisting of ashes, cinders, any non-combustible solids components or uncombusted bulky material residues; and (ii) the solids residues of (i) are withdrawn from the first vessel for disposal; and (iii) the bed of particulate solids in the second vessel is formed from a solids supply separate from the first vessel.

2. Process as claimed in claim 1, including the integers of A), wherein the fuel gas is withdrawn from the ash withdrawal region along a meandering continuation of the aforesaid constricting pathway.

3. Process as claimed in claim 1, including the integers of A), wherein the fuel gas is withdrawn in counter-current heat exchange with gasification medium being fed to the gasification zone.

4. Process as claimed in claim 1, including the integers of A) and wherein at least part of the dry distillation volatiles formed in the dry distillation zone pass in counter-current to the bed of particulate solids of the dry distillation zone through that bed and are withdrawn from near the solids supply region, feeding the dry distillation zone with carbonaceous solids, and are from there forwarded, at least in part, into the gasification zone; wherein the dry distillation takes place, at least in part, in a first vessel separate from a second vessel, in which the gasification zone is maintained; and wherein from the first vessel, solids residues composed predominantly of non-combustible solids residues are withdrawn from that region of the first distillation vessel which is remote from its solids supply region, whereas the second vessel is supplied with solids for forming its bed of particulate solids, at least in part not being the solids withdrawn from the said region remote from the solids supply region of the first vessel.

5. Gas generator suitable for performing the process as claimed in claim 1 for generating a fuel gas product, including solids feeder means discharging into a solids supply portion of a dry distillation zone, in which dry distillation zone solids introduced by the solids feeder means are heated, dried if necessary and subjected to dry distillation, thereby to release dry distillation volatiles into a gasification zone supplied with and containing a bed of gasifiable carbonaceous solids downstream of the dry distillation zone and supported on a fire grate device, restricting the rate of downward movement of the solids of the bed under gravity in co-current with dry distillation volatiles released from the dry distillation zone as well as the gasification media and the generated fuel gas in the gasification zone flowing through the particulate solids bed, a supply of oxygen-bearing gases in the dry distillation zone supporting partial combustion therein for heating the dry distillation zone and a supply of gasification medium being provided for maintaining gasification conditions in the gasification zone by the provision of feed lines for gasification media to be introduced into the particulate solids bed which enter into the gasification zone, at least the lower region of the bed of gasifiable carbonaceous solids being maintained in an embers bed condition through which the dry distillation volatiles and volatilised products of gasification pass in order to be subjected to thermal cracking and including an ash withdrawal region including a gas separation zone and discharge passage for the generated fuel gas product and further including additional features adapted for further decreasing the content of condensable dry distillation volatiles in the fuel gas product by increasing the intimate contact of the gases and vapours with the solids beds through which they pass, selected from either or both of the following:

a) that in relation to higher lying regions of the gasification zone (5; 5a; 5b) the fire grate device (73; 73a), acting further as a discharge element for the solids residues of the gasification, defines a constricted peripheral passage (116; 116a) for the embers bed of the gasification zone between the outer periphery of the fire grate device (73; 73a) and the inner periphery of the exterior walls (82, 85) of the gasification zone, which constricted peripheral passage merges into a downwardly and inwardly funnel-like sloping constricting pathway (116; 116a) below the fire grate device leading into and ending with the ash withdrawal region (121; 121a), where the separation occurs between the ashes and any cinders and the generated fuel gas product;

b) that through at least one dry distillation zone solids to be dry-distilled pass in the form of a particulate solids bed (30) under the action of gravity, wherein further a gasification medium feed means (3) for an oxygen-containing gas enters below the particulate solids bed (2) and wherein for the withdrawal from the dry distillation zone of the dry distillation volatiles, formed with heat generation by partial combustion of the solids in the dry distillation reactor, a dry distillation gas duct (4) is connected in the region of the solids supply means (1) and so enters into a gasification zone, that the dry distillation gas flows through the particulate solids bed (139) in the gasification zone in intimate contact with and in co-current to the solids material, subject further to the condition that, at least when feature a) is absent and where the at least one dry distillation zone, which is designed for the particulate solids bed therein and the flow of dry distillation volatiles to pass in counter-current to one another, is to be maintained in a first vessel distinct and separate from a second vessel, wherein the bed of carbonaceous solids and gases pass in co-current with one another,
(i) the first vessel (2) is designed for the bed of particulate solids to be combusted and gasified substantially entirely to solids residues consisting of ashes, cinders and any noncombustible solids components or uncombusted bulky material residues; and (ii) has a discharge locality (22) at its bottom end for the disposal of the solid residues; and that (iii) the second vessel (5) has its own supply means (6; 68–70) for the introduction, separate from the first vessel (2), of gasifiable material which is to form the bed of particulate solids in the second vessel (5).

6. Gas generator as claimed in claim 5, and including the integers of a), wherein the fuel gas discharge passage(s) passes, at least in part, in heat exchanging counter-current with a feed passage (133) for gasification medium and/or oxygen-bearing gas.

7. Gas generator as claimed in claim 5, and including the integers of a), wherein the bottom (114; 114a) of the downwardly and inwardly sloping pathway has a funnel-shaped configuration, forming a sliding surface for the ash, feeding into a central aperture (115; 115a; 115b).

8. Gas generator as claimed in claim 5, wherein at least part of the dry distillation zone (2) is accommodated in a first reactor vessel (26) separate from a second reactor vessel (71) accommodating the gasification zone (5), and a duct or passage (4) is provided for feeding dry distillation volatiles from the first vessel into the second vessel.

9. Gas generator as claimed in claim 5 and including the integers of b), wherein the solids to be dry-distilled pass through a dry distillation reactor (2) in a particulate solids bed (30) under the action of gravity, wherein further a gasification medium feed means (3) for an oxygen-containing gas enters below the particulate solids bed and wherein for the withdrawal from the dry distillation zone of the dry distillation volatiles, formed with heat generation by partial combustion of the solids in the dry distillation reactor, a dry distillation gas duct (4) is connected in the region of the solids supply means (1) and so enters into a gasification reactor (5) that the dry distillation volatiles flow through the particulate solids bed (139) in the gasification reactor (5) in co-current to the solids material.

10. A process for the generation of a fuel gas by dry distillation of carbonaceous solids in a dry distillation zone into which the carbonaceous solids are fed via a solids supply and in which the solids are heated, where applicable dried and are dry-distilled with the liberation of dry distillation volatiles and, by further conversion of those volatiles in a gasification zone in the presence of carbonaceous solids passing through the gasification zone at least in part under gravity in the form of a bed of particulate solids, to which gasification media are fed in substoichiometric quantities, the dry distillation volatiles withdrawn from the dry distillation zone entering the gasification zone and flowing through the bed of particulate solids being there maintained in co-current with the direction of travel of the latter, an embers bed being formed by the bed of particulate solids in the terminal portion of the gasification zone in the region of a fire grate element acting further as a solids discharge element for the residual solids after completion of the gasification, through which embers bed the gas formed in the bed of particulate solids passes, whereby condensable volatiles components contained in the gas are cracked, and wherein the fuel gas so generated is withdrawn from the lower region of the bed of particulate solids of the gasification zone, wherein gas containing oxygen is introduced into the dry distillation zone in substoichiometric amount for generating heat by partial combustion of the solids to be dry-distilled passing through the dry distillation zone in the form of a bed of particulate solids under the action of gravity before the generated fuel gas product is separated from ashes and any cinders and is withdrawn and forwarded for further use, said process further comprising additional measures for further decreasing the content of condensable dry distillation volatiles in the fuel gas product by increasing the intimate contact of the gases and vapours with the solids beds through which they pass, selected from either or both of the following:

A) that the embers bed of the gasification zone is conducted from the higher lying regions of said zone under gravity towards and through a constricted lower peripheral passage region of the gasification zone defined between the outer periphery of the fire grate element and the inner periphery of exterior walls of a reactor in which the process is performed, and in co-current therewith the dry distillation volatiles and gasification gases and any gaseous cracking products are passed in intimate contact with and through the embers bed and from there travels down a funnel-shaped inwardly sloping constricting pathway below the fire grate element leading into and ending with the ash withdrawal region, where the separation occurs between the ashes and any cinders and the generated fuel gas product;

B) that in at least one dry distillation zone in the form of a bed of particulate solids under the action of gravity the gas present in that zone passes through the solids in counter-current to the direction of travel of the solids to be dry distilled, the solids thereby being dry distilled and the dry distillation volatiles thereby formed in the dry distillation zone being withdrawn from the dry distillation zone near the solids supply region and that at least part of the dry distillation volatiles formed in the dry distillation zone withdrawn from near the solids supply region feeding the dry distillation zone with carbonaceous solids are from there forwarded into the gasification zone, where they, together with gasification gases and any gaseous cracking products, pass in co-current with and in intimate contact with and through the embers bed of the gasification zone and are subjected to cracking of condensable volatiles, before being separated from ashes and any cinders and being withdrawn as a fuel gas product, subject further to the condition that, at least when feature A) is absent and where the at least one dry distillation zone, wherein the bed of particulate solids and the gas present therein pass in counter-current to one another, is maintained in a first vessel, distinct and separate from a second vessel, wherein the bed of carbonaceous solids and the gases and vapours pass in co-current with one another,
  (i) the bed of particulate solids in the first vessel is there combusted and gasified substantially entirely to solids residues consisting of ashes, cinders, any non-combustible solids components or uncombusted bulky material residues; and
  (ii) the solids residues of (i) are withdrawn from the first vessel for disposal; and
  (iii) the bed of particulate solids in the second vessel is formed from a solids supply separate from the first vessel, said process including at least the integers of B) and wherein, at least in the event that the dry distillation zone and the gasification zone are maintained in separate dry distillation and gasification vessels, solids residues composed predominantly of non-combustible solids residues are withdrawn from that region of the dry distillation vessel which is remote from its solids supply region, whereas the gasification vessel is supplied with solids for forming its bed of particulate solids at least in part different from the solids residues withdrawn from the said region remote from the solids supply region of the dry distillation vessel.

11. Gas generator for generating a fuel gas product, including solids feeder means discharging into a solids supply portion of a dry distillation zone, in which dry distillation zone solids introduced by the solids feeder means are heated, dried if necessary and subjected to dry distillation, thereby to release dry distillation volatiles into a gasification zone supplied with and containing a bed of gasifiable carbonaceous solids downstream of the dry distillation zone and supported on a fire grate device, restricting the rate of downward movement of the solids of the bed under gravity in co-current with dry distillation volatiles released from the dry distillation zone as well as the gasification media and the generated fuel gas in the gasification zone flowing through the particulate solids bed, a supply of oxygen-bearing gases in the dry distillation zone supporting partial combustion therein for heating the dry distillation zone and a supply of gasification medium being provided for maintaining gasification conditions in the gasification zone by the provision of feed lines for gasification media to be introduced into the particulate solids bed which enter into the gasification zone, at least the lower region of the bed of gasifiable carbonaceous solids being maintained in an embers bed condition through which the dry distillation volatiles and volatilised products of gasification pass in order to be subjected to thermal cracking and including an ash withdrawal region including a gas separation zone and discharge passage for the generated fuel gas product and further including additional features adapted for further decreasing the content of condensable dry distillation volatiles in the fuel gas product by increasing the intimate contact of the gases and vapours with the solids beds through which they pass, selected from either or both of the following:

a) that in relation to higher lying regions of the gasification zone (5; 5a; 5b) the fire grate device (73; 73a), acting further as a discharge element for the solids residues of the gasification, defines a constricted peripheral passage (116; 116a) for the embers bed of the gasification zone between the outer periphery of the fire grate device (73; 73a) and the inner periphery of the exterior walls (82, 85) of the gasification zone, which constricted peripheral passage merges into a downwardly and inwardly funnel-like sloping constricting pathway (116; 116a) below the fire grate device leading into and ending with the ash withdrawal region (121; 121a), where the separation occurs between the ashes and any cinders and the generated fuel gas product;

b) that through at least one dry distillation zone solids to be dry-distilled pass in the form of a particulate solids bed (30) under the action of gravity, wherein further a gasification medium feed means (3) for an oxygen-containing gas enters below the particulate solids bed (2) and wherein for the withdrawal from the dry distillation zone of the dry distillation volatiles, formed with heat generation by partial combustion of the solids in the dry distillation reactor, a dry distillation gas duct (4) is connected in the region of the solids supply means (1) and so enters into a gasification zone, that the dry distillation gas flows through the particulate solids bed (139) in the gasification zone in intimate contact with and in co-current to the solids material, subject further to the condition that, at least when feature a) is absent and where the at least one dry distillation zone, which is designed for the particulate solids bed therein and the flow of dry distillation volatiles to pass in counter-current to one another, is to be maintained in a first vessel distinct and separate from a second vessel, wherein the bed of carbonaceous solids and gases pass in co-current with one another,
(i) the first vessel (2) is designed for the bed of particulate solids to be combusted and gasified substantially entirely to solids residues consisting of ashes, cinders and any noncombustible solids components or uncombusted bulky material residues; and
(ii) has a discharge locality (22) at its bottom end for the disposal of the solid residues; and that
(iii) the second vessel (5) has its own supply means (6; 68–70) for the introduction, separate from the first vessel (2), of gasifiable material which is to form the bed of particulate solids in the second vessel (5),
said gas generator including the integers of a), including baffles (118, 119, 118a, 119a) defining a meandering continuation of the downwardly and inwardly sloping constricting pathway, the meandering continuation forming the inlet side to the discharge passage (123, 128) for generated fuel gas.

12. Gas generator for generating a fuel gas product, including solids feeder means discharging into a solids supply portion of a dry distillation zone, in which dry distillation zone solids introduced by the solids feeder means are heated, dried if necessary and subjected to dry distillation, thereby to release dry distillation volatiles into a gasification zone supplied with and containing a bed of gasifiable carbonaceous solids downstream of the dry distillation zone and supported on a fire grate device, restricting the rate of downward movement of the solids of the bed under gravity in co-current with dry distillation volatiles released from the dry distillation zone as well as the gasification media and the generated fuel gas in the gasification zone flowing through the particulate solids bed, a supply of oxygen-bearing gases in the dry distillation zone supporting partial combustion therein for heating the dry distillation zone and a supply of gasification medium being provided for maintaining gasification conditions in the gasification zone by the provision of feed lines for gasification media to be introduced into the particulate solids bed which enter into the gasification zone, at least the lower region of the bed of gasifiable carbonaceous solids being maintained in an embers bed condition through which the dry distillation volatiles and volatilised products of gasification pass in order to be subjected to thermal cracking and including an ash withdrawal region including a gas separation zone and discharge passage for the generated fuel gas product and further including additional features adapted for further decreasing the content of condensable dry distillation volatiles in the fuel gas product by increasing the intimate contact of the gases and vapours with the solids beds through which they pass, selected from either or both of the following:
a) that in relation to higher lying regions of the gasification zone (5; 5a; 5b) the fire grate device (73; 73a), acting further as a discharge element for the solids residues of the gasification, defines a constricted peripheral passage (116; 116a) for the embers bed of the gasification zone between the outer periphery of the fire grate device (73; 73a) and the inner periphery of the exterior walls (82, 85) of the gasification zone, which constricted peripheral passage merges into a downwardly and inwardly funnel-like sloping constricting pathway (116; 116a) below the fire grate device leading into and ending with the ash withdrawal region (121; 121a), where the separation occurs between the ashes and any cinders and the generated fuel gas product;
b) that through at least one dry distillation zone solids to be dry-distilled pass in the form of a particulate solids bed (30) under the action of gravity, wherein further a gasification medium feed means (3) for an oxygen-containing gas enters below the particulate solids bed (2) and wherein for the withdrawal from the dry distillation zone of the dry distillation volatiles, formed with heat generation by partial combustion of the solids in the dry distillation reactor, a dry distillation gas duct (4) is connected in the region of the solids supply means (1) and so enters into a gasification zone, that the dry distillation gas flows through the particulate solids bed (139) in the gasification zone in intimate contact with and in co-current to the solids material, subject further to the condition that, at least when feature a) is absent and where the at least one dry distillation zone, which is designed for the particulate solids bed therein and the flow of dry distillation volatiles to pass in counter-current to one another, is to be maintained in a first vessel distinct and separate from a second vessel, wherein the bed of carbonaceous solids and gases pass in co-current with one another,
(i) the first vessel (2) is designed for the bed of particulate solids to be combusted and gasified substantially entirely to solids residues consisting of ashes, cinders and any non-combustible solids components or uncombusted bulky material residues; and
(ii) has a discharge locality (22) at its bottom end for the disposal of the solid residues; and that
(iii) the second vessel (5) has its own supply means (6; 68–70) for the introduction, separate from the first vessel (2), of gasifiable material which is to form the bed of particulate solids in the second vessel (5)
said gas generator including the integers of a), wherein the fire grate device (73; 73a) is a rotary fire grate device; wherein the rotary fire grate device (73; 73a) has a downwardly conically or pyramidally flaring bed support surface; and wherein the rotary fire grate device (73; 73a) is mounted on a central rotary drive shaft (74; 74a) which includes a feed passage for oxygen-bearing gas and/or gasifying medium.

13. Gas generator as claimed in claim 12, wherein the rotary fire grate device includes a vertical succession of conically or pyramidally flaring bed support surfaces (109, 110; 109a, 110a).

14. Gas generator for generating a fuel gas product, including solids feeder means discharging into a solids supply portion of a dry distillation zone, in which dry distillation zone solids introduced by the solids feeder means are heated, dried if necessary and subjected to dry distillation, thereby to release dry distillation volatiles into a gasification zone supplied with and containing a bed of gasifiable carbonaceous solids downstream of the dry distillation zone and supported on a fire grate device, restricting the rate of downward movement of the solids of the bed under gravity in co-current with dry distillation volatiles released from the dry distillation zone as well as the gasification media and the generated fuel gas in the gasification zone flowing through the particulate solids bed, a supply of oxygen-bearing gases in the dry distillation zone supporting partial combustion therein for heating the dry distillation zone and a supply of gasification medium being provided for maintaining gasification conditions in the gasification zone by the provision of feed lines for gasification media to be introduced into the particulate solids bed which enter into the gasification zone, at least the lower region of the bed of gasifiable carbonaceous solids being maintained in an embers bed condition through which the dry distillation volatiles and volatilised products of gasification pass in order to be subjected to thermal cracking and including an ash withdrawal region including a gas separation zone and discharge passage for the generated fuel gas product and further including additional features adapted for further decreasing the content of condensable dry distillation volatiles in the fuel gas product by increasing the intimate contact of the gases and vapours with the solids beds through which they pass, selected from either or both of the following:
- a) that in relation to higher lying regions of the gasification zone (5; 5a; 5b) the fire grate device (73; 73a), acting further as a discharge element for the solids residues of the gasification, defines a constricted peripheral passage (116; 116a) for the embers bed of the gasification zone between the outer periphery of the fire grate device (73; 73a) and the inner periphery of the exterior walls (82, 85) of the gasification zone, which constricted peripheral passage merges into a downwardly and inwardly funnel-like sloping constricting pathway (116; 116a) below the fire grate device leading into and ending with the ash withdrawal region (121; 121a), where the separation occurs between the ashes and any cinders and the generated fuel gas product;
- b) that through at least one dry distillation zone solids to be dry-distilled pass in the form of a particulate solids bed (30) under the action of gravity, wherein further a gasification medium feed means (3) for an oxygen-containing gas enters below the particulate solids bed (2) and wherein for the withdrawal from the dry distillation zone of the dry distillation volatiles, formed with heat generation by partial combustion of the solids in the dry distillation reactor, a dry distillation gas duct (4) is connected in the region of the solids supply means (1) and so enters into a gasification zone, that the dry distillation gas flows through the particulate solids bed (139) in the gasification zone in intimate contact with and in co-current to the solids material, subject further to the condition that, at least when feature a) is absent and where the at least one dry distillation zone, which is designed for the particulate solids bed therein and the flow of dry distillation volatiles to pass in counter-current to one another, is to be maintained in a first vessel distinct and separate from a second vessel, wherein the bed of carbonaceous solids and gases pass in co-current with one another,
  - (i) the first vessel (2) is designed for the bed of particulate solids to be combusted and gasified substantially entirely to solids residues consisting of ashes, cinders and any noncombustible solids components or uncombusted bulky material residues; and
  - (ii) has a discharge locality (22) at its bottom end for the disposal of the solid residues; and that
  - (iii) the second vessel (5) has its own supply means (6; 68–70) for the introduction, separate from the first vessel (2), of gasifiable material which is to form the bed of particulate solids in the second vessel (5), said gas generator including the integers of a), wherein the underside of the fire grate device (73; 73a) defining the upper side of the downwardly and inwardly sloping constricted pathway includes formations (122) acting on the movement of the bed in the constricted pathway.

15. Gas generator for generating a fuel gas product, including solids feeder means discharging into a solids supply portion of a dry distillation zone, in which dry distillation zone solids introduced by the solids feeder means are heated, dried if necessary and subjected to dry distillation, thereby to release dry distillation volatiles into a gasification zone supplied with and containing a bed of gasifiable carbonaceous solids downstream of the dry distillation zone and supported on a fire grate device, restricting the rate of downward movement of the solids of the bed under gravity in co-current with dry distillation volatiles released from the dry distillation zone as well as the gasification media and the generated fuel gas in the gasification zone flowing through the particulate solids bed, a supply of oxygen-bearing gases in the dry distillation zone supporting partial combustion therein for heating the dry distillation zone and a supply of gasification medium being provided for maintaining gasification conditions in the gasification zone by the provision of feed lines for gasification media to be introduced into the particulate solids bed which enter into the gasification zone, at least the lower region of the bed of gasifiable carbonaceous solids being maintained in an embers bed condition through which the dry distillation volatiles and volatilised products of gasification pass in order to be subjected to thermal cracking and including an ash withdrawal region including a gas separation zone and discharge passage for the generated fuel gas product and further including additional features adapted for further decreasing the content of condensable dry distillation volatiles in the fuel gas product by increasing the intimate contact of the gases and vapours with the solids beds through which they pass, selected from either or both of the following:
- a) that in relation to higher lying regions of the gasification zone (5; 5a; 5b) the fire grate device (73; 73a), acting further as a discharge element for the solids residues of the gasification, defines a constricted peripheral passage (116; 116a) for the embers bed of the gasification zone between the outer periphery of the fire grate device (73; 73a) and the inner periphery of the exterior walls (82, 85) of the gasification zone, which constricted peripheral passage merges into a downwardly and inwardly funnel-like sloping constricting pathway (116; 116a) below the fire grate device leading into and ending with the ash withdrawal region (121; 121a), where the separation occurs between the ashes and any cinders and the generated fuel gas product;
- b) that through at least one dry distillation zone solids to be dry-distilled pass in the form of a particulate solids bed (30) under the action of gravity, wherein further a gasification medium feed means (3) for an oxygen-containing gas enters below the particulate solids bed (2) and wherein for the withdrawal from the dry distillation zone of the dry distillation volatiles, formed with heat generation by partial combustion of the solids in the dry distillation reactor, a dry distillation gas duct (4) is connected in the region of the solids supply means (1) and so enters into a gasification zone, that the dry distillation gas flows through the particulate solids bed (139) in the gasification zone in intimate contact with and in co-current to the solids material, subject further to the condition that, at least when feature a) is absent and where the at least one dry distillation zone, which is designed for the particulate solids bed therein and the flow of dry distillation volatiles to pass in counter-current to one another, is to be maintained in a first vessel distinct and separate from a second vessel, wherein the bed of carbonaceous solids and gases pass in co-current with one another, (i) the first vessel (2) is designed for the bed of particulate solids to be combusted and gasified substantially entirely to solids residues consisting of ashes, cinders and any non-combustible solids components or uncombusted bulky material residues; and (ii) has a discharge locality (22) at its bottom end for the disposal of the solid residues; and that (iii) the second vessel (5) has its own supply means (6; 68–70) for the introduction, separate from the first vessel (2), of gasifiable material which is to form the bed of particulate solids in the second vessel (5), said gas generator including the integers of a), wherein the fire grate device (73; 73a) and solids discharge element includes a hollow conical or pyramidal body (109; 109a) connected to a supply (104, 99) of gasifying medium and having gasifying medium outlet formations (103) on its underside (113) leading into a region of the gasification zone where gasification conditions are to be maintained.

16. Gas generator as claimed in claim 15, wherein the rotary fire grate device includes a vertical succession of conically or pyramidally flaring bed support surfaces (109, 110; 109a, 110a) and wherein the underside of the hollow conical or pyramidal body (110; 110a) communicates with the apex region of a further hollow conical or pyramidal body (109; 109a), through which the gasification medium is to be supplied.

17. Gas generator for generating a fuel gas product, including solids feeder means discharging into a solids supply portion of a dry distillation zone, in which dry distillation zone solids introduced by the solids feeder means are heated, dried if necessary and subjected to dry distillation, thereby to release dry distillation volatiles into a gasification zone supplied with and containing a bed of gasifiable carbonaceous solids downstream of the dry distillation zone and supported on a fire grate device, restricting the rate of downward movement of the solids of the bed under gravity in co-current with dry distillation volatiles released from the dry distillation zone as well as the gasification media and the generated fuel gas in the gasification zone flowing through the particulate solids bed, a supply of oxygen-bearing gases in the dry distillation zone supporting partial combustion therein for heating the dry distillation zone and a supply of gasification medium being provided for maintaining gasification conditions in the gasification zone by the provision of feed lines for gasification media to be introduced into the particulate solids bed which enter into the gasification zone, at least the lower region of the bed of gasifiable carbonaceous solids being maintained in an embers bed condition through which the dry distillation volatiles and volatilised products of gasification pass in order to be subjected to thermal cracking and including an ash withdrawal region including a gas separation zone and discharge passage for the generated fuel gas product and further including additional features adapted for further decreasing the content of condensable dry distillation volatiles in the fuel gas product by increasing the intimate contact of the gases and vapours with the solids beds through which they pass, selected from either or both of the following:

a) that in relation to higher lying regions of the gasification zone (5; 5a; 5b) the fire grate device (73; 73a), acting further as a discharge element for the solids residues of the gasification, defines a constricted peripheral passage (116; 116a) for the embers bed of the gasification zone between the outer periphery of the fire grate device (73; 73a) and the inner periphery of the exterior walls (82, 85) of the gasification zone, which constricted peripheral passage merges into a downwardly and inwardly funnel-like sloping constricting pathway (116; 116a) below the fire grate device leading into and ending with the ash withdrawal region (121; 121a), where the separation occurs between the ashes and any cinders and the generated fuel gas product;

b) that through at least one dry distillation zone solids to be dry-distilled pass in the form of a particulate solids bed (30) under the action of gravity, wherein further a gasification medium feed means (3) for an oxygen-containing gas enters below the particulate solids bed (2) and wherein for the withdrawal from the dry distillation zone of the dry distillation volatiles, formed with heat generation by partial combustion of the solids in the dry distillation reactor, a dry distillation gas duct (4) is connected in the region of the solids supply means (1) and so enters into a gasification zone, that the dry distillation gas flows through the particulate solids bed (139) in the gasification zone in intimate contact with and in co-current to the solids material, subject further to the condition that, at least when feature a) is absent and where the at least one dry distillation zone, which is designed for the particulate solids bed therein and the flow of dry distillation volatiles to pass in counter-current to one another, is to be maintained in a first vessel distinct and separate from a second vessel, wherein the bed of carbonaceous solids and gases pass in co-current with one another, (i) the first vessel (2) is designed for the bed of particulate solids to be combusted and gasified substantially entirely to solids residues consisting of ashes, cinders and any non-combustible solids components or uncombusted bulky material residues; and (ii) has a discharge locality (22) at its bottom end for the disposal of the solid residues; and that (iii) the second vessel (5) has its own supply means (6; 68–70) for the introduction, separate from the first vessel (2), of gasifiable material which is to form the bed of particulate solids in the second vessel (5), and wherein in the discharge region of the gasification zone for the discharge of the solids residues a baffle device (118, 119; 118a, 119a) is provided in such a manner that the discharge of solids residues is limited to a maximum solids particle size and/or to a limited discharge rate and wherein for the separation of solids residues to be discharged and fuel gas to be released, a gas passage formation (124; 130) is provided, guiding the fuel gas out of the solids residues bed along a meandering pathway (130, 130a, 130b).

18. Gas generator for generating a fuel gas product, including solids feeder means discharging into a solids supply portion of a dry distillation zone, in which dry distillation zone solids introduced by the solids feeder means are heated, dried if necessary and subjected to dry distillation, thereby to release dry distillation volatiles into a gasification zone supplied with and containing a bed of gasifiable carbonaceous solids downstream of the dry distillation zone and supported on a fire grate device, restricting the rate of downward movement of the solids of the bed under gravity in co-current with dry distillation volatiles released from the dry distillation zone as well as the gasification media and the generated fuel gas in the gasification zone flowing through the particulate solids bed, a supply of oxygen-bearing gases in the dry distillation zone supporting partial combustion therein for heating the dry distillation zone and a supply of gasification medium being provided for maintaining gasification conditions in the gasification zone by the provision of feed lines for gasification media to be introduced into the particulate solids bed which enter into the gasification zone, at least the lower region of the bed of gasifiable carbonaceous solids being maintained in an embers bed condition through which the dry distillation volatiles and volatilised products of gasification pass in order to be subjected to thermal cracking and including an ash withdrawal region including a gas separation zone and discharge passage for the generated fuel gas product and further including additional features adapted for further decreasing the content of condensable dry distillation volatiles in the fuel gas product by increasing the intimate contact of the gases and vapours with the solids beds through which they pass, selected from either or both of the following:

a) that in relation to higher lying regions of the gasification zone (5; 5a; 5b) the fire grate device (73; 73a), acting further as a discharge element for the solids residues of the gasification, defines a constricted peripheral passage (116; 116a) for the embers bed of the gasification zone between the outer periphery of the fire grate device (73; 73a) and the inner periphery of the exterior walls (82, 85) of the gasification zone, which constricted peripheral passage merges into a downwardly and inwardly funnel-like sloping constricting pathway (116; 116a) below the fire grate device leading into and ending with the ash withdrawal region (121; 121a), where the separation occurs between the ashes and any cinders and the generated fuel gas product;

b) that through at least one dry distillation zone solids to be dry-distilled pass in the form of a particulate solids bed (30) under the action of gravity, wherein further a gasification medium feed means (3) for an oxygen-containing gas enters below the particulate solids bed (2) and wherein for the withdrawal from the dry distillation zone of the dry distillation volatiles, formed with heat generation by partial combustion of the solids in the dry distillation reactor, a dry distillation gas duct (4) is connected in the region of the solids supply means (1) and so enters into a gasification zone, that the dry distillation gas flows through the particulate solids bed (139) in the gasification zone in intimate contact with and in co-current to the solids material, subject further to the condition that, at least when feature a) is absent and where the at least one dry distillation zone, which is designed for the particulate solids bed therein and the flow of dry distillation volatiles to pass in counter-current to one another, is to be maintained in a first vessel distinct and separate from a second vessel, wherein the bed of carbonaceous solids and gases pass in co-current with one another, (i) the first vessel (2) is designed for the bed of particulate solids to be combusted and gasified substantially entirely to solids residues consisting of ashes, cinders and any non-combustible solids components or uncombusted bulky material residues; and (ii) has a discharge locality (22) at its bottom end for the disposal of the solid residues; and that (iii) the second vessel (5) has its own supply means (6; 68–70) for the introduction, separate from the first vessel (2), of gasifiable material which is to form the bed of particulate solids in the second vessel (5), said gas generator including the integers of a), wherein the discharge element (73; 73a) is fitted to a drive shaft (74; 74a) which is rotatable in the particulate solids bed, and wherein the drive shaft (74; 74a) of the discharge element in the gasification reactor is designed as a hollow shaft and serves as a gas duct.

19. Gas generator for generating a fuel gas product, including solids feeder means discharging into a solids supply portion of a dry distillation zone, in which dry distillation zone solids introduced by the solids feeder means are heated, dried if necessary and subjected to dry distillation, thereby to release dry distillation volatiles into a gasification zone supplied with and containing a bed of gasifiable carbonaceous solids downstream of the dry distillation zone and supported on a fire grate device, restricting the rate of downward movement of the solids of the bed under gravity in co-current with dry distillation volatiles released from the dry distillation zone as well as the gasification media and the generated fuel gas in the gasification zone flowing through the particulate solids bed, a supply of oxygen-bearing gases in the dry distillation zone supporting partial combustion therein for heating the dry distillation zone and a supply of gasification medium being provided for maintaining gasification conditions in the gasification zone by the provision of feed lines for gasification media to be introduced into the particulate solids bed which enter into the gasification zone, at least the lower region of the bed of gasifiable carbonaceous solids being maintained in an embers bed condition through which the dry distillation volatiles and volatilised products of gasification pass in order to be subjected to thermal cracking and including an ash withdrawal region including a gas separation zone and discharge passage for the generated fuel gas product and further including additional features adapted for further decreasing the content of condensable dry distillation volatiles in the fuel gas product by increasing the intimate contact of the gases and vapours with the solids beds through which they pass, selected from either or both of the following:

a) that in relation to higher lying regions of the gasification zone (5; 5a; 5b) the fire grate device (73; 73a), acting further as a discharge element for the solids residues of the gasification, defines a constricted peripheral passage (116; 116a) for the embers bed of the gasification zone between the outer periphery of the fire grate device (73; 73a) and the inner periphery of the exterior walls (82, 85) of the gasification zone, which constricted peripheral passage merges into a downwardly and inwardly funnel-like sloping constricting pathway (116; 116a) below the fire grate device leading into and ending with the ash withdrawal region (121; 121a), where the separation occurs between the ashes and any cinders and the generated fuel gas product;

b) that through at least one dry distillation zone solids to be dry-distilled pass in the form of a particulate solids bed (30) under the action of gravity, wherein further a gasification medium feed means (3) for an oxygen-containing gas enters below the particulate solids bed (2) and wherein for the withdrawal from the dry distillation zone of the dry distillation volatiles, formed with heat generation by partial combustion of the solids in the dry distillation reactor, a dry distillation gas duct (4) is connected in the region of the solids supply means (1) and so enters into a gasification zone, that the dry distillation gas flows through the particulate solids bed (139) in the gasification zone in intimate contact with and in co-current to the solids material, subject further to the condition that, at least when feature a) is absent and where the at least one dry distillation zone, which is designed for the particulate solids bed therein and the flow of dry distillation volatiles to pass in counter-current to one another, is to be maintained in a first vessel distinct and separate from a second vessel, wherein the bed of carbonaceous solids and gases pass in co-current with one another, (i) the first vessel (2) is designed for the bed of particulate solids to be combusted and gasified substantially entirely to solids residues consisting of ashes, cinders and any non-combustible solids components or uncombusted bulky material residues; and (ii) has a discharge locality (22) at its bottom end for the disposal of the solid residues; and that (iii) the second vessel (5) has its own supply means (6; 68–70) for the introduction, separate from the first vessel (2), of gasifiable material which is to form the bed of particulate solids in the second vessel (5), wherein at least part of the dry distillation zone (2) is accommodated in a first reactor vessel (26) separate from a second reactor vessel (71) accommodating the gasification zone (5), and a duct or passage (4) is provided for feeding dry distillation volatiles from the first vessel into the second vessel and wherein the first reactor vessel (26) includes a solids feeder (27, 28, 29) means discharging into a solids supply portion of a dry distillation zone, in which dry distillation zone solids introduced by the solids feeder means are heated, dried if necessary and subjected to dry distillation, thereby to release dry distillation volatiles and a fire grate device, between which and the solids feeder a dry distillation zone (2) is situated, and feed means (3) for oxygen-containing gas enter into a lower region of the dry distillation zone (2) from where partial combustion conditions are to be created, as well as gas withdrawal ducts connected to the upper region of the dry distillation zone (2); and wherein the duct or passage (4) for feeding dry distillation volatiles from the first reactor vessel (26) into the second reactor vessel (71) enter the second vessel in an upper region (96) of the second reactor vessel.

20. Gas generator for generating a fuel gas product, including solids feeder means discharging into a solids supply portion of a dry distillation zone, in which dry distillation zone solids introduced by the solids feeder means are heated, dried if necessary and subjected to dry distillation, thereby to release dry distillation volatiles into a gasification zone supplied with and containing a bed of gasifiable carbonaceous solids downstream of the dry distillation zone and supported on a fire grate device, restricting the rate of downward movement of the solids of the bed under gravity in co-current with dry distillation volatiles released from the dry distillation zone as well as the gasification media and the generated fuel gas in the gasification zone flowing through the particulate solids bed, a supply of oxygen-bearing gases in the dry distillation zone supporting partial combustion therein for heating the dry distillation zone and a supply of gasification medium being provided for maintaining gasification conditions in the gasification zone by the provision of feed lines for gasification media to be introduced into the particulate solids bed which enter into the gasification zone, at least the lower region of the bed of gasifiable carbonaceous solids being maintained in an embers bed condition through which the dry distillation volatiles and volatilised products of gasification pass in order to be subjected to thermal cracking and including an ash withdrawal region including a gas separation zone and discharge passage for the generated fuel gas product and further including additional features adapted for further decreasing the content of condensable dry distillation volatiles in the fuel gas product by increasing the intimate contact of the gases and vapours with the solids beds through which they pass, selected from either or both of the following:

a) that in relation to higher lying regions of the gasification zone (5; 5a; 5b) the fire grate device (73; 73a), acting further as a discharge element for the solids residues of the gasification, defines a constricted peripheral passage (116; 116a) for the embers bed of the gasification zone between the outer periphery of the fire grate device (73; 73a) and the inner periphery of the exterior walls (82, 85) of the gasification zone, which constricted peripheral passage merges into a downwardly and inwardly funnel-like sloping constricting pathway (116; 116a) below the fire grate device leading into and ending with the ash withdrawal region (121; 121a), where the separation occurs between the ashes and any cinders and the generated fuel gas product;

b) that through at least one dry distillation zone solids to be dry-distilled pass in the form of a particulate solids bed (30) under the action of gravity, wherein further a gasification medium feed means (3) for an oxygen-containing gas enters below the particulate solids bed (2) and wherein for the withdrawal from the dry distillation zone of the dry distillation volatiles, formed with heat generation by partial combustion of the solids in the dry distillation reactor, a dry distillation gas duct (4) is connected in the region of the solids supply means (1) and so enters into a gasification zone, that the dry distillation gas flows through the particulate solids bed (139) in the gasification zone in intimate contact with and in co-current to the solids material, subject further to the condition that, at least when feature a) is absent and where the at least one dry distillation zone, which is designed for the particulate solids bed therein and the flow of dry distillation volatiles to pass in counter-current to one another, is to be maintained in a first vessel distinct and separate from a second vessel, wherein the bed of carbonaceous solids and gases pass in co-current with one another, (i) the first vessel (2) is designed for the bed of particulate solids to be combusted and gasified substantially entirely to solids residues consisting of ashes, cinders and any non-combustible solids components or uncombusted bulky material residues; and (ii) has a discharge locality (22) at its bottom end for the disposal of the solid residues; and that (iii) the second vessel (5) has its own supply means (6; 68–70) for the introduction, separate from the first vessel (2), of gasifiable material which is to form the bed of particulate solids in the second vessel (5), said gas generator including a cylindrical shaft reactor and a coaxial drive shaft (74; 74a; 74b) carrying a rotary fire grate and/or bed support and/or bed agitation/reconstitution means and discharge element (73; 73a; 73b), including an inlet (276) for oxygen-containing gas near the top (273) of the solids supply region (271, 272) of the cylindrical shaft reactor (5b) and including a supply pipe (274) for oxygen-containing gas surrounding the drive shaft (74; 74a; 74b) forming a gas passage leading from near the said top (273) down into an upper partial combustion region of the solids bed.

21. Gas generator as claimed in claim 20, wherein the lower end of the supply pipe (274) is associated with a further rotary bed agitating member (278).

* * * * *